United States Patent
Mori et al.

(10) Patent No.: US 8,249,768 B2
(45) Date of Patent: Aug. 21, 2012

(54) METHOD FOR CONTROLLING THE HYBRID DRIVE OF A MOTOR VEHICLE AND CONTROL SYSTEM

(75) Inventors: Peter Mori, Graz (AT); Theodor Schöberl, Graz (AT); Helmut Martin, Graz (AT); Florian Kramer, Graz (AT); Clemens Burow, Graz (AT); Jan-Erik Hein, Graz (AT); Manfred Posch, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 100 days.

(21) Appl. No.: 12/518,455

(22) PCT Filed: Dec. 11, 2007

(86) PCT No.: PCT/EP2007/010778
§ 371 (c)(1),
(2), (4) Date: Apr. 28, 2010

(87) PCT Pub. No.: WO2008/071381
PCT Pub. Date: Jun. 19, 2008

(65) Prior Publication Data
US 2011/0130901 A1    Jun. 2, 2011

(30) Foreign Application Priority Data
Dec. 11, 2006  (AT) ................ GM 856/2006

(51) Int. Cl.
*G06F 17/00* (2006.01)
(52) U.S. Cl. ........... 701/22; 701/51; 701/54; 701/58; 701/87; 701/101; 903/902; 903/907; 903/930; 903/945; 62/137; 62/340; 62/353; 123/90.15; 477/3; 477/5

(58) Field of Classification Search ............ 701/22, 701/51, 54, 58, 87, 101, 103, 105; 903/902, 903/907, 930, 945; 108/65.265, 65.28, 65.285, 108/197; 62/137, 340, 353; 123/90.15, 198 F; 477/3, 5

See application file for complete search history.

(56) References Cited

U.S. PATENT DOCUMENTS
5,270,930 A    12/1993 Ito et al.
(Continued)

FOREIGN PATENT DOCUMENTS
DE    10353256    3/2005
(Continued)

*Primary Examiner* — James Trammell
*Assistant Examiner* — McDieunel Marc
(74) *Attorney, Agent, or Firm* — Bachman & LaPointe, P.C.

(57) ABSTRACT

A method and an apparatus for controlling the hybrid drive of a motor vehicle having the following components: internal combustion engine (VKM), manual transmission (SG), at least one electrical machine ($Em_i$), at least one clutch ($K_j$) and an energy storage device (ES), and at least one driven axle (HA; VA) are intended to provide maximum efficiency and service life of the components. To this end, a decision is made about which operating modes (AMK) are possible on the basis of a driver input (FW) and operating state, a division is made about which gears ($G_j$) are available for the possible operating modes (AMK), so that a larger number of modes (AMGK) are available for selection, operating points which correspond to the driver input are determined for all these modes (AMGK), taking into account the operating state and system state (SZA), the modes (AMGK) are assessed and the mode (AMGK*) which is assessed as being most expedient is selected.

12 Claims, 25 Drawing Sheets

U.S. PATENT DOCUMENTS

| | | | |
|---|---|---|---|
| 5,343,970 A * | 9/1994 | Severinsky | 180/65.25 |
| 6,321,143 B1 | 11/2001 | Phillips et al. | |
| 7,017,692 B2 | 3/2006 | Grassl et al. | |
| 7,249,642 B2 * | 7/2007 | Tabata et al. | 180/65.275 |
| 7,377,344 B2 | 5/2008 | Barske | |
| 2004/0060751 A1 | 4/2004 | Frank | |
| 2004/0070270 A1 | 4/2004 | Gunji | |
| 2005/0279546 A1 * | 12/2005 | Tabata et al. | 180/65.2 |
| 2009/0200094 A1 | 8/2009 | Zohrer et al. | |
| 2010/0025131 A1 * | 2/2010 | Gloceri et al. | 180/65.28 |
| 2010/0324762 A1 * | 12/2010 | Imaseki et al. | 701/22 |
| 2011/0004363 A1 * | 1/2011 | Severinsky et al. | 701/22 |
| 2011/0093147 A1 * | 4/2011 | Kaltenbach et al. | 701/22 |
| 2011/0190971 A1 * | 8/2011 | Severinsky et al. | 701/22 |

FOREIGN PATENT DOCUMENTS

| | | |
|---|---|---|
| DE | 102004004867 | 8/2005 |
| WO | 02/26520 | 4/2002 |
| WO | 2006/034520 | 4/2006 |

* cited by examiner

| AMK | Description | Axle torque | Axle |
|---|---|---|---|
| 1 | Recuperation with EM2; ICE in overrun operation | negative | all wheel drive |
| 2 | Overrun operation ICE; EM2 coupled to FA | negative | HA |
| 3 | Recuperation with EM1 and EM2 | negative | all wheel drive |
| 6 | Recuperation with EM1; EM2 coupled to FA | negative | HA |
| 9 | Selector lever in position N (v need to be 0) | 0 | -- |
| 10 | Electric driving with EM1; EM2 coupled to FA | positive | HA |
| 13 | Electric all-wheel drive | positive | all wheel drive |
| 14 | Recuperation with EM1 and EM2; ICE at idle | negative | all wheel drive |
| 17 | Recuperation with EM1; ICE at idle; EM2 coupled to FA | negative | HA |
| 20 | Electric driving with EM1; ICE at idle; EM2 coupled to FA | positive | HA |

Fig. 3a

| Fig. 3a | Fig. 3c |
|---|---|
| Fig. 3b | Fig. 3d |

| | | | |
|---|---|---|---|
| 21 | Electric driving with EM2; ICE at idle; EM1 and ICE coupled | positive | VA |
| 28 | LPAH; EM2 coupled to FA | positive | HA |
| 29 | ICE driving; EM2 coupled to FA | positive | HA |
| 30 | Boost with EM1; EM2 coupled to FA | positive | HA |
| 31 | Electric driving with EM2, series hybrid | positive | VA |
| 32 | All-wheel drive; LPAH | positive | all wheel drive |
| 33 | All-wheel drive | positive | all wheel drive |
| 34 | All-wheel drive, boost with EM1 | positive | all wheel drive |
| 35 | Recuperation with EM1; ICE in overrun operation | negative | HA |
| 36 | Recuperation with EM1 and EM2; ICE in overrun operation | negative | all wheel drive |

Fig. 3b

| Torques | | | Battery | Clutches | | | | |
| --- | --- | --- | --- | --- | --- | --- | --- | --- |
| ICE | EM1 | EM2 | | C1 | C2 | C3 | C4 | |
| -1 | 0 | -1 | charged | closed | closed | closed | open | D |
| -1 | 0 | 0 | - | closed | closed | closed | open | D |
| 0 | -1 | -1 | charged | closed | open | closed | open | B |
| 0 | -1 | 0 | charged | closed | open | closed | open | B |
| 0 | 0 | 0 | - | closed | closed | open | open | A |
| 0 | 1 | 0 | discharged | closed | open | closed | open | B |
| 0 | 1 | 1 | discharged | closed | open | closed | open | B |
| LL | -1 | -1 | charged | closed | open | closed | open | B |
| LL | -1 | 0 | charged | closed | open | closed | open | B |
| LL | 1 | 0 | discharged | closed | open | closed | open | B |

Fig. 3c

| LL | | | | | | | | C/D |
|---|---|---|---|---|---|---|---|---|
| 1 | 0 | 1 | discharged | open | closed | closed | open | C |
| 1 | -1 | 0 | charged | closed | closed | closed | open | D |
| 1 | 0 | 0 |  | closed | closed | closed | open | D |
| 1 | 1 | 0 | discharged | closed | closed | closed | open | D |
| 1 | -1 | 1 | discharged/charged | open | closed | closed | open | C |
| 1 | -1 | 1 | discharged/charged | closed | closed | closed | open | D |
| 1 | 0 | 1 | discharged | closed | closed | closed | open | D |
| 1 | 1 | 1 | discharged | closed | closed | closed | open | D |
| -1 | -1 | 0 | charged | closed | closed | closed | open | D |
| -1 | -1 | -1 | charged | closed | closed | closed | open | D |

Fig. 3d

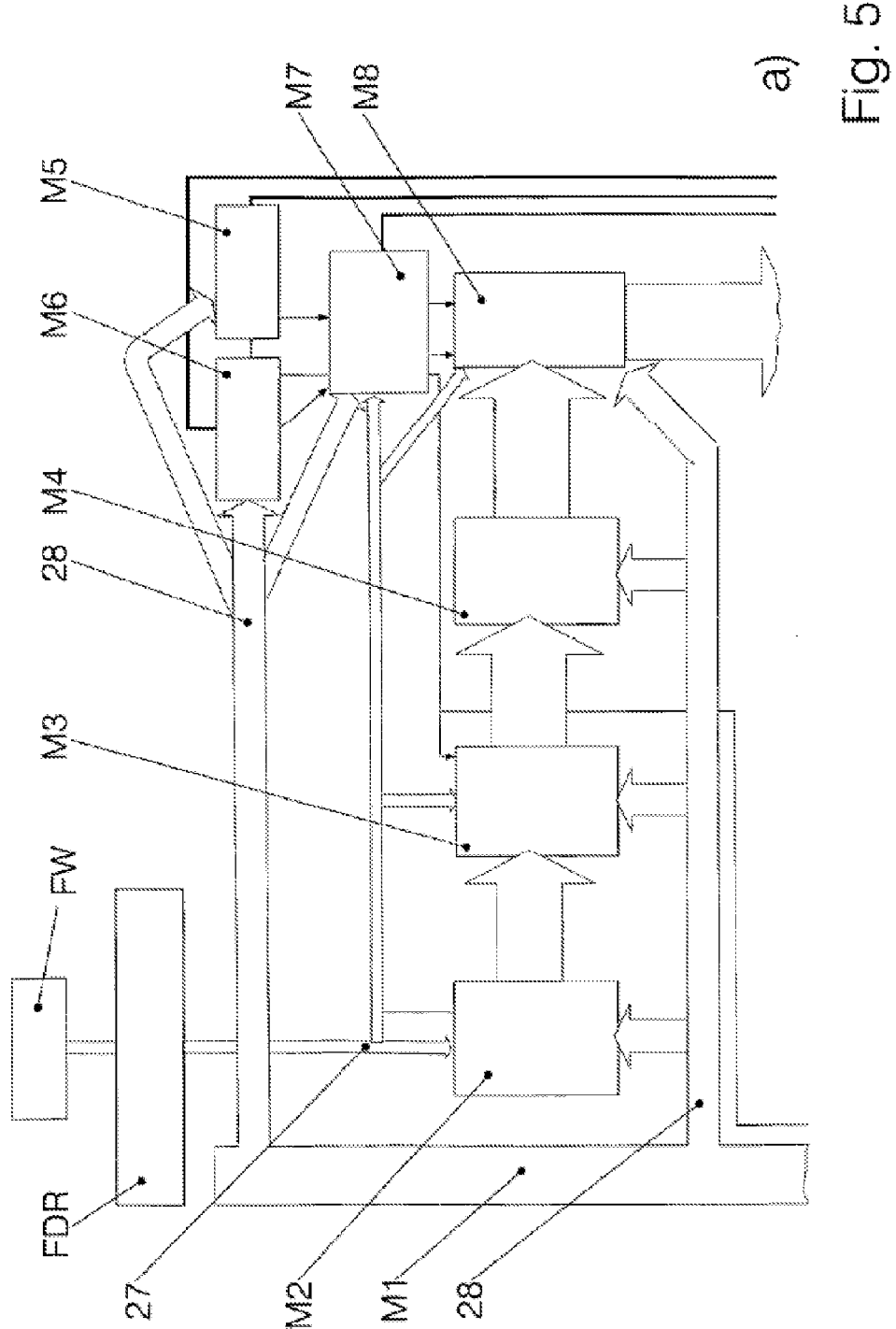

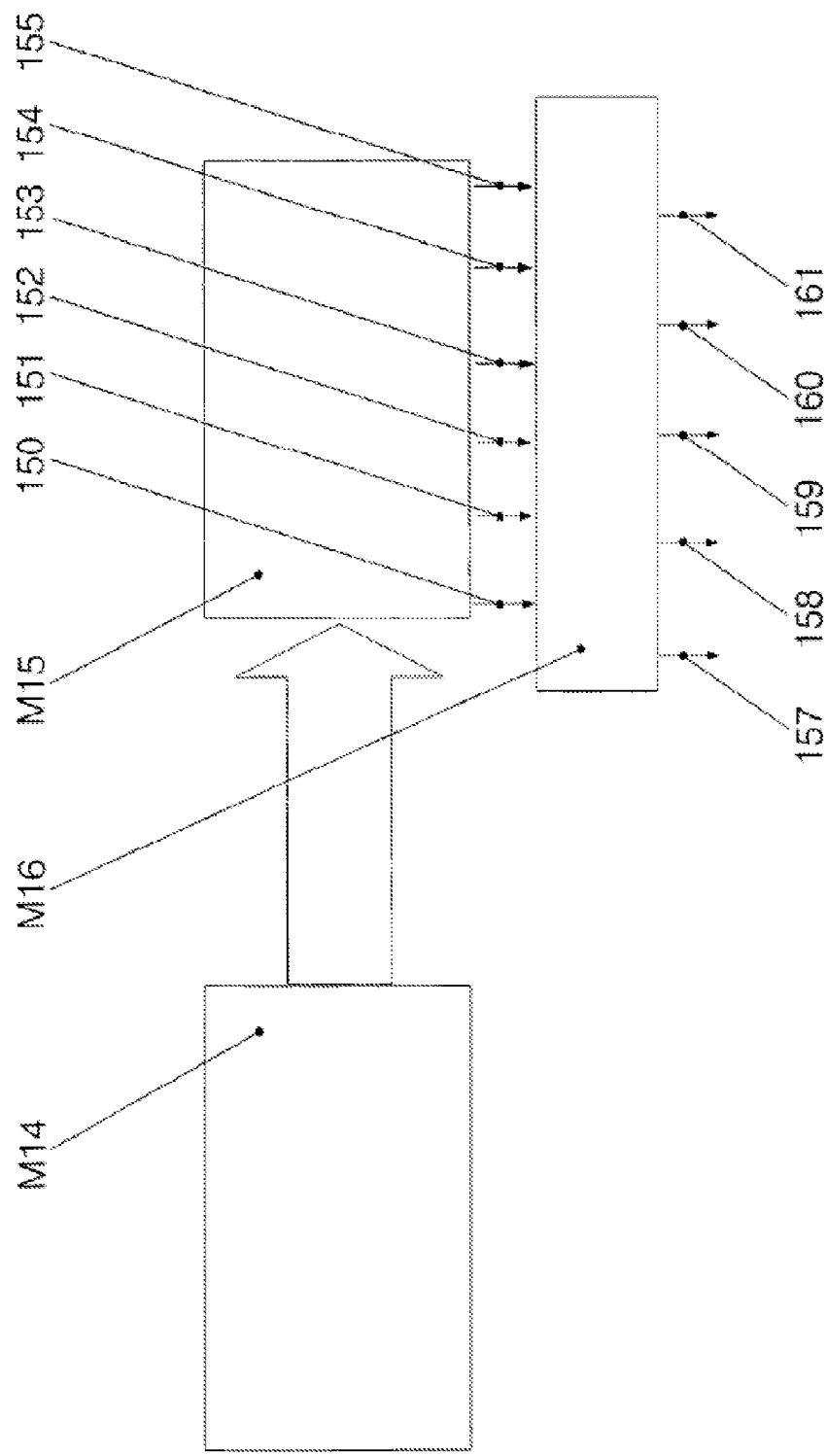

METHOD FOR CONTROLLING THE HYBRID DRIVE OF A MOTOR VEHICLE AND CONTROL SYSTEM

BACKGROUND OF THE INVENTION

The invention relates to a method for controlling the hybrid drive of a motor vehicle, which hybrid drive comprises the following components: an internal combustion engine, an axle drive transmission, at least one electric machine, at least one clutch, at least one energy store, and at least one driven axle. In the simplest case, the hybrid drive to be controlled is composed of an internal combustion engine, an electric machine that is arranged in series and that can be operated as a motor and as a generator, a single-stage (that is to say non-shiftable) step-down transmission and differential, as an axle drive transmission, for a driven axle. The hybrid drive to be controlled may however also comprise a plurality of electric machines in a more complex arrangement, a plurality of clutches and a plurality of—in particular two—driven axles.

In known controllers, the driver demand and capacities of the torque sources and sinks (this means the electric machine and the internal combustion engine) are coordinated with one another in branched and complex logical decision trees, wherein the mode that leads to the fulfillment of the driver demand is selected at an early stage, and only then are the operating points determined and, as a result, the activation signals for the individual components generated. For this reason alone, it is not possible for the capacities of all the components to be optimally utilized at the same time and for said components to also be operated at their most economical operating points at which they are subjected to the least wear. In the case of a shift transmission, this is exacerbated by the fact that the transmission gear to be selected must also be incorporated in the optimization. With a branched logic of said type, an adaptation to driving dynamics requirements can only be obtained with difficulty. This is particularly disadvantageous if a limitation of wheel slip is desired or even, in a vehicle with two driven axles, the distribution of the torque between the two axles is to be controlled.

Here, and in the following text, the word "mode" is to be understood to mean the sum of drive constellations and operating states of the components, for example: "driving with drive provided by the internal combustion engine", "driving with electric drive", "driving with mixed drive", "coasting", "accelerating", "charging the battery", "braking with energy recuperation", etc. If the system comprises a plurality of electric machines, a plurality of clutches and two driven axles, there are also several further modes. If said modes are each linked with possible transmission gears, an even greater number of modes are generated, which number may run into three figures.

A further problem with heavily branched logic which can only be overcome with difficulty is the transition from one mode to another. According to U.S. Pat. No. 6,321,143, it is sought to solve said problem by means of heirarchically arranged priorities between the individual modes, and a system of flags, the definition of which is very complicated, and the effect of which is doubtful.

WO 02/26520 A1 discloses a simpler type of control of a hybrid drive, in which a heirarchical separation is provided between the definition of the nominal operating state and the distribution of the torque demand between the provided torque sources and sinks. It is thereby possible to reduce the system complexity, albeit with restricted functionality. In said document, an "efficiency optimizing" mode is also provided, but said mode optimizes not the efficiency of the entire arrangement but rather only the efficiency of the internal combustion engine; the efficiencies and restrictions of the other components remain unconsidered.

It is therefore an object of the invention to create a control method and a controller for hybrid drives which, while avoiding the above-specified disadvantages, or by solving the above-stated problems, offer the greatest possible efficiency, the maximum service life of the components, a high level of driving comfort and the capability of allowing for all driving dynamics requirements. Driving comfort also includes a free and smooth transition from one mode to another.

SUMMARY OF THE INVENTION

The method for controlling the hybrid drive of a motor vehicle according to the invention which hybrid drive comprises the following components: an internal combustion engine (ICE), a multi-step transmission (ST), a rear axle differential (RAD) and a front axle differential (FAD), at least one electric machine (EM1; EM1, EM2), at least one clutch ($C_j$) and at least one energy store (ES), and at least one driven axle (RA; FA; RA, FA), is composed of steps:

a) at least one required torque corresponding to the driver demand (DD) is calculated on the basis of data that describes the driver demand (DD), the operating state of the motor vehicle and the system state analysis (SSA), b) on the basis of said data, which describes at least one torque and the operating state of the motor vehicle and the system state (SSA), from all modes, the list of possible operating modes, or possible modes (AMK, AMGK) and transmission stages (G) are determined, c) for said possible modes (AMGK), optimum operating points (OP), which correspond to the driver demand (DD), of the components involved in the individual respective modes are determined taking into consideration the operating state and system state (SSA), d) wherein, for the calculation of the optimum efficiencies ($\eta_{ICE}$, $\eta_{EM1}$, $\eta_{EM2}$) and operating points (OP) of the possible modes (AMGK), firstly, the limit values of the maximum torque of individual machines (ICE, EM1, EM2) are calculated for each gear stage (G) taking into consideration the mechanical configuration and the transmission ratios ($Ü_{ST}$, $Ü_{FAD}$, $Ü_{RAD}$)

then, for all modes (AMGK), the optimum operating points (OP) of the individual machines (ICE, EM1, EM2) are determined taking into consideration limit values, and, for said operating points (OP), the individual efficiencies ($\eta_{ICE}$, $\eta_{EM1}$, $\eta_{EM2}$) and, resulting from these, the overall efficiencies ($\eta_{AMGK}$) for all the possible modes are determined.

Since firstly all the modes that fulfill the driver demand even in any way (in the case of a multi-step transmission, including the possible transmission gears) are taken into consideration and, in effect, simultaneously "run through", and the selection first takes place in a much later step, the optimum mode is always available for any driver demand, and a transition between the individual modes is possible substantially without flags or priorities. This makes the control more flexible. As a result of the flexibility, driving dynamics interventions are possible, and the control can be more easily adapted to different vehicles by means of the selection of corresponding parameters and stored characteristic maps.

The simultaneous "run-through" of the modes encompasses a determination of the operating points of the individual components taking into consideration the operating state and system state, both of the present operating state and also of the operating state to be set corresponding to the driver demand. Since the operating point of the components is determined, for each mode, on the basis of fixed stored variables (which may also be limit values) or characteristic maps and of the system state, the operating points of the individual components can be optimally selected. Therefore, in the individual modes, an optimization takes place even before the selection of a certain mode. It is the case, so to speak, that the already-optimized modes are evaluated, and that which is evaluated as being the best is selected. In this way, the capacity of all the components is utilized optimally. In the selected mode, the variables already determined during the optimization of the operating points are then available at the operating points for the control intervention for adjusting the components. This also facilitates and simplifies the transition from one mode to another.

If a transmission with a transmission ratio that can be varied in a stepped fashion (in the form of the transmission gears) is provided as an axle drive transmission, it is decided, for the possible modes, which transmission gears are possible for the operating state corresponding to the driver demand, as a result of which the number of modes dealt with is correspondingly increased. If the transmission ratio of the transmission is variable in a stepless fashion, that is to say continuously, the transmission ratio is treated as an additional variable in the method according to the invention.

In one advantageous refinement of the method, in the determination of the operating points of the components involved in the respective mode, for all the modes, the efficiencies of the components are also simultaneously determined, and said efficiencies are merged to form an overall efficiency for all the modes (AMK and AMGK) and are taken into consideration in the evaluation and selection of the mode (with and without a multi-step transmission). In this way, not only is the optimum operating point for the individual components determined, but also the optimum efficiency of the entire system. The optimization is, in a sense, two-tier optimization.

For the pre-selection of all the possible modes from the driver demand, operating state and system state, at least one torque, required corresponding to the driver demand, to be transmitted to the wheels of the vehicle is calculated, which calculation takes place so as to adhere to driving dynamics specifications in a driving dynamics controller (without such specifications, directly from the driver demand), and the pre-selection is made on the basis of said torque. In the case of a motor vehicle having two driven axles, firstly only the entire torque to be transmitted is determined, and the distribution thereof between the axles is determined only if a traction intervention is present, and otherwise only in a later step. A traction intervention is carried out for example by a slip controller or by a driving dynamics controller.

It is recommendable to check, inter alia in order to increase operational reliability, whether all the components required for the possible operating modes are available, intact and functional to the required degree. If this is not the case for a mode, the corresponding mode is eliminated from the further process. Since said check takes place at an early stage, it is also prevented that modes that are temporarily not available are entrained in the quasi-simultaneous processing. It is also possible to introduce suitable emergency measures at this point.

The calculation of the efficiencies in the individual modes in the operating state corresponding to the driver demands may take place in various ways depending on the complexity of the hybrid drive and according to requirements. A torque to be transmitted by the driven wheels corresponds to the desired operating state. Said torque is limited on account of the mechanical design. Therefore, for each gear stage taking into consideration, if appropriate, interposed transmission ratios, the limit value of the maximum transmissible torque of individual components is calculated. The operating points, which correspond to the driver demand, of the individual machines are determined taking into consideration limit values of torque and power, and then, for said operating points, by means of stored efficiency characteristic maps, firstly the individual efficiencies at the operating points are determined, and from these, the overall efficiencies for the possible modes are determined (without a multi-step transmission, or with a multi-step transmission).

The limit values for the determination of the operating point are preferably limit values of the power of the individual components that are determined from the thermal state and from characteristic maps of the respective components and/or limit values of the power input capacity of the energy store (ES) in its present charging state, which are determined from characteristic maps of the energy store. The limit values are limit values of the transmissible torque, and therefore of the torque to be transmitted, which are determined from the driver demand, the operating state of the components and the system state. The introduction of said limit values leads to substantially optimum operating points and therefore also in each case to optimum efficiencies that are evaluated as a result. The position of the operating points with respect to the limit values is also incorporated into the evaluation. Both contribute to a maximization of the service life of the individual components.

For the most precise possible calculation of the overall efficiency, the mechanical power that is output to the wheels of the vehicle is set in relation to the fuel consumption. Here, in traction operation, the energy stored in the battery is determined from the efficiency chain, that is run through during the charging of the battery, from the internal combustion engine via the electric machine that is operated as a generator and the associated power electronics, and in the overrun mode, only the electric charging power is taken into consideration.

In one refinement of the method according to the invention, it is also possible for further criteria to be taken into consideration for the evaluation of the modes: thermal criteria taking into consideration the system state and characteristic maps of the thermal behavior of the machines (that is the components which generate a torque), which states are also utilized in the determination of the power limits of the individual machines; and/or criteria from a dynamics aspect taking into consideration the driver demand and driving states that are also taken into consideration for defining the limit torques of the individual machines for calculating the efficiencies. This is referred to as dynamics management.

Furthermore, for the evaluation of the modes (AMK, AMGK), it is possible, as a system state, for the state of the energy store and if appropriate of the characteristic map thereof during charging and discharging to be taken into consideration that is used in the determination of the power limits. This also benefits the service life of the energy store. Comfort aspects (in particular during shifting of the transmission gears) may also be incorporated in the evaluation. For the overall evaluation, the individual value grades are then merged, the modes sorted according to the evaluation and the mode with the highest value grade (AMGK*) selected.

For the output of the nominal values or commands, corresponding to the selected mode, for the adjustment of the components involved in the selected mode, it is possible to resort to the data determined during the calculation of the efficiency of the selected mode (AMGK) for the optimum operating point (the latter with a multi-step transmission). This saves on processing time and contributes to a smooth transition from one mode into another.

The nominal values or commands are finally converted into activation signals for the components. In the case of two driven axles, and when a traction intervention is taking place, the torque distribution between the front axle and rear axle takes place during the course of the determination of the operating point and the calculation of the overall efficiency. In this way, the torque is distributed between the two driven axles with optimum efficiency even during normal driving (when a traction intervention is not taking place).

The present changeable variables (for example rotational speeds, torques, temperatures), and intermediate variables (for example acceleration of the vehicle, maximum rotational speed of the internal combustion engine) calculated from these, are preferably always available in all steps in the system state analysis module, and can preferably be called from the latter at any time.

The invention also relates to a control system for a motor vehicle with a hybrid drive which is composed of the following components: an internal combustion engine, an axle drive transmission—in particular a shift transmission—at least one electric machine, at least one clutch, at least one energy store and at least one driven axle, with a driver demand evaluation detecting, from the throttle pedal position, the brake pedal position and a variable that corresponds to the driving speed (for example the wheel rotational speed), the operating state (acceleration, deceleration, kickdown, etc.) that the driver wishes to attain.

The control system is composed of a series of modules which, in a program controller, are imaginary units in the program sequence, which units themselves again comprise individual blocks (which are assigned boxes in the figures). The particular configuration, function and arrangement of the modules and blocks enable the execution of the method according to the invention. The manner in which and the effect with which this takes place can be gathered from the description of the system on the basis of an exemplary embodiment.

BRIEF DESCRIPTION OF THE DRAWINGS

The invention is described and explained below on the basis of figures, in which:

FIG. 3 shows a table of the modes of the hybrid drive of FIG. 2,
FIG. 21 shows a block diagram of module 15 in FIG. 5.

DETAILED DESCRIPTION

Figure 1:
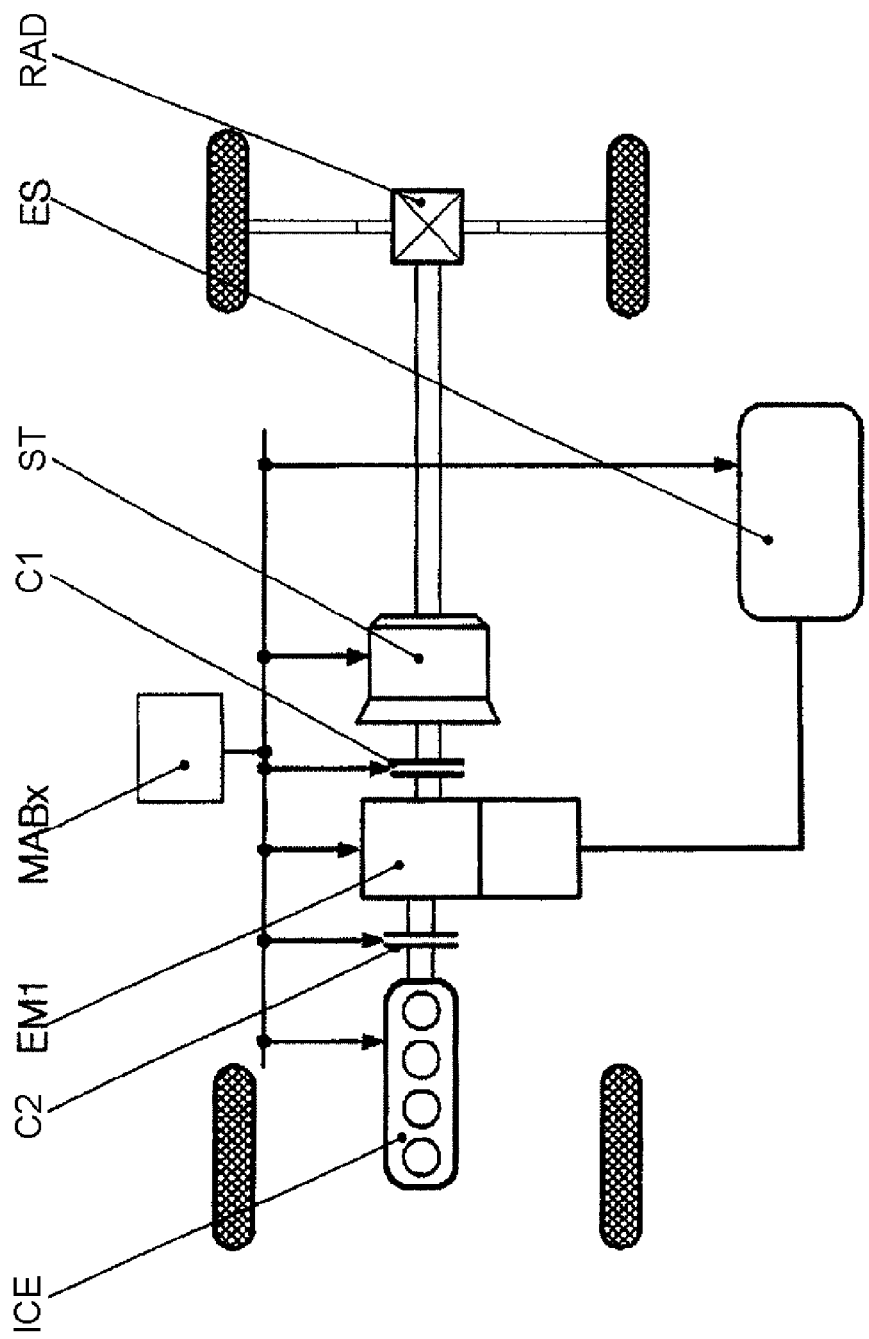
FIG. 1 shows a schematic diagram of a hybrid drive, in which the control according to the invention can be used, in its simplest form.

A simple hybrid drive that can be controlled using the method according to the invention, as per FIG. 1, is composed of the following components: an internal combustion engine ICE, an electric machine EM1, a shift transmission ST or a transmission with a fixed step-down transmission ratio, a rear axle differential RAD and an energy store ES—a high-capacity high-voltage battery, referred to simply as a battery below, or the like, and also a first clutch C1 between the electric machine EM1 and the shift transmission ST, and a second clutch C2 between the internal combustion engine ICE and the electric machine EM1. A control unit (MABx) is connected to the components by means of lines that are not shown in detail in FIG. 1. The internal combustion engine ICE and the electric machine EM1 are summarized below under the term "machines".

Figure 2:
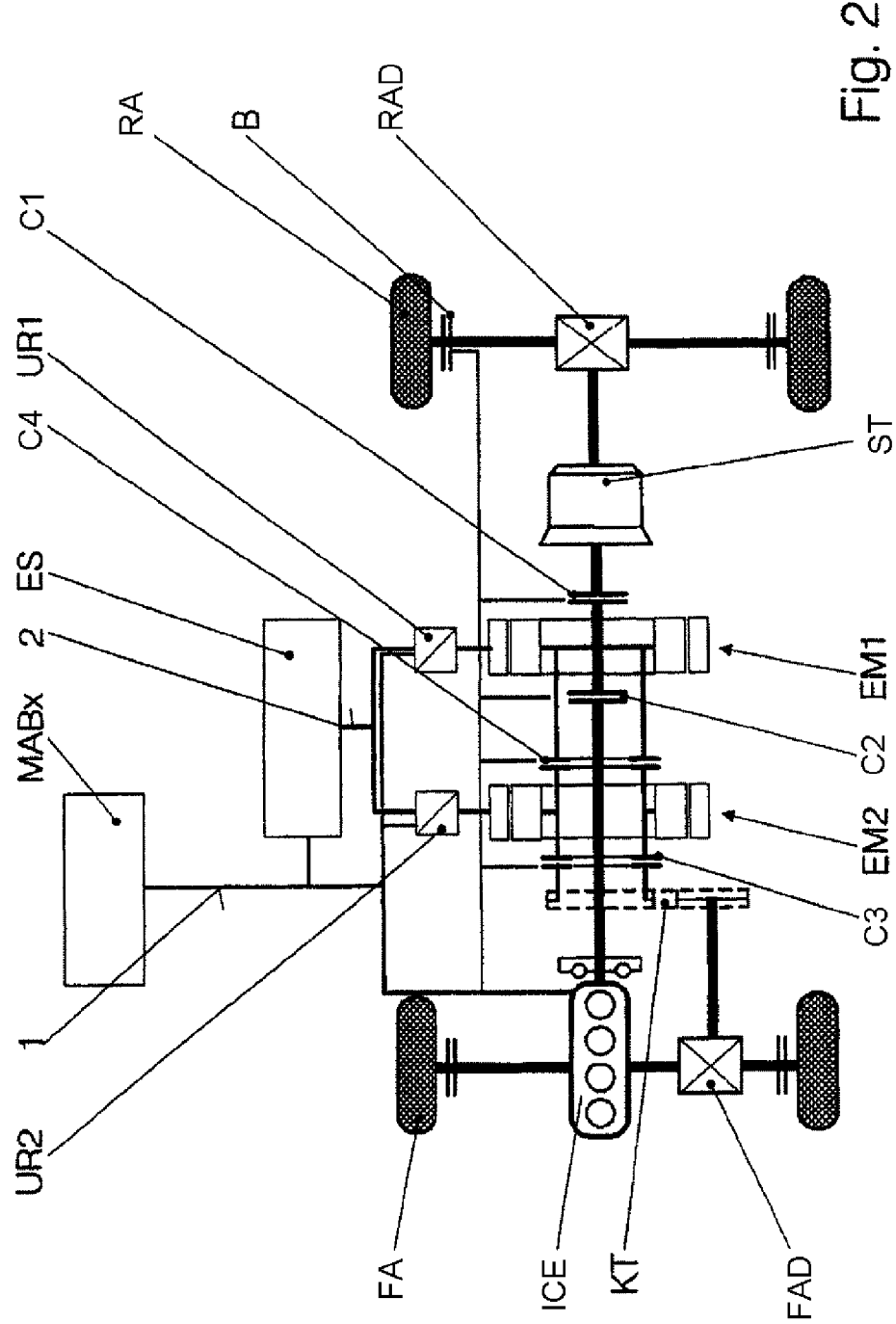
FIG. 2 shows a schematic diagram of a more complex hybrid drive in which the control according to the invention can be used.

FIG. 2 shows a complex hybrid drive to which the exemplary embodiment described further below relates. Said hybrid drive is composed of the following components: an internal combustion engine ICE, two electric machines EM1, EM2 with their inverters (UR1, UR2), a shift transmission ST, a rear axle differential RAD and a front axle differential FAD for the two driven axles RA, FA and an energy store ES. One of the four wheel brakes B is indicated at only one wheel. Also provided: a first clutch C1 between the electric machine EM1 and a shift transmission ST, a second clutch C2 between the internal combustion engine ICE and the electric machine EM1, a third clutch C3 between the second electric machine EM2 and the drive output KT for driving the front axle FA and a fourth clutch C4 between the two electric machines EM1, EM2. A control unit MABx is connected to the components by means of lines, denoted summarily by 1. Lines denoted summarily by 2 serve to conduct electrical energy between the electric machines EM1, EM2 and the energy store ES. With the exception of the clutch C4, said arrangement substantially corresponds to that described in the Austrian utility model AT GM 8336 U1.

FIG. 3 summarizes, in a table, the most important (but not all) modes AMK that can be generated using said components. The columns specify, after the AMK number and the description of the operating mode, the axle torque (negative=overrun mode, positive=traction mode) and which axle(s) is/are driven. Further columns specify the operating state of the machines ICE, EM1, EM2 (1=traction operation, −1=overrun operation, 0=deactivated, LL=idle), of the battery ES and the switching state of the clutches C1 to C4.

Figure 4:
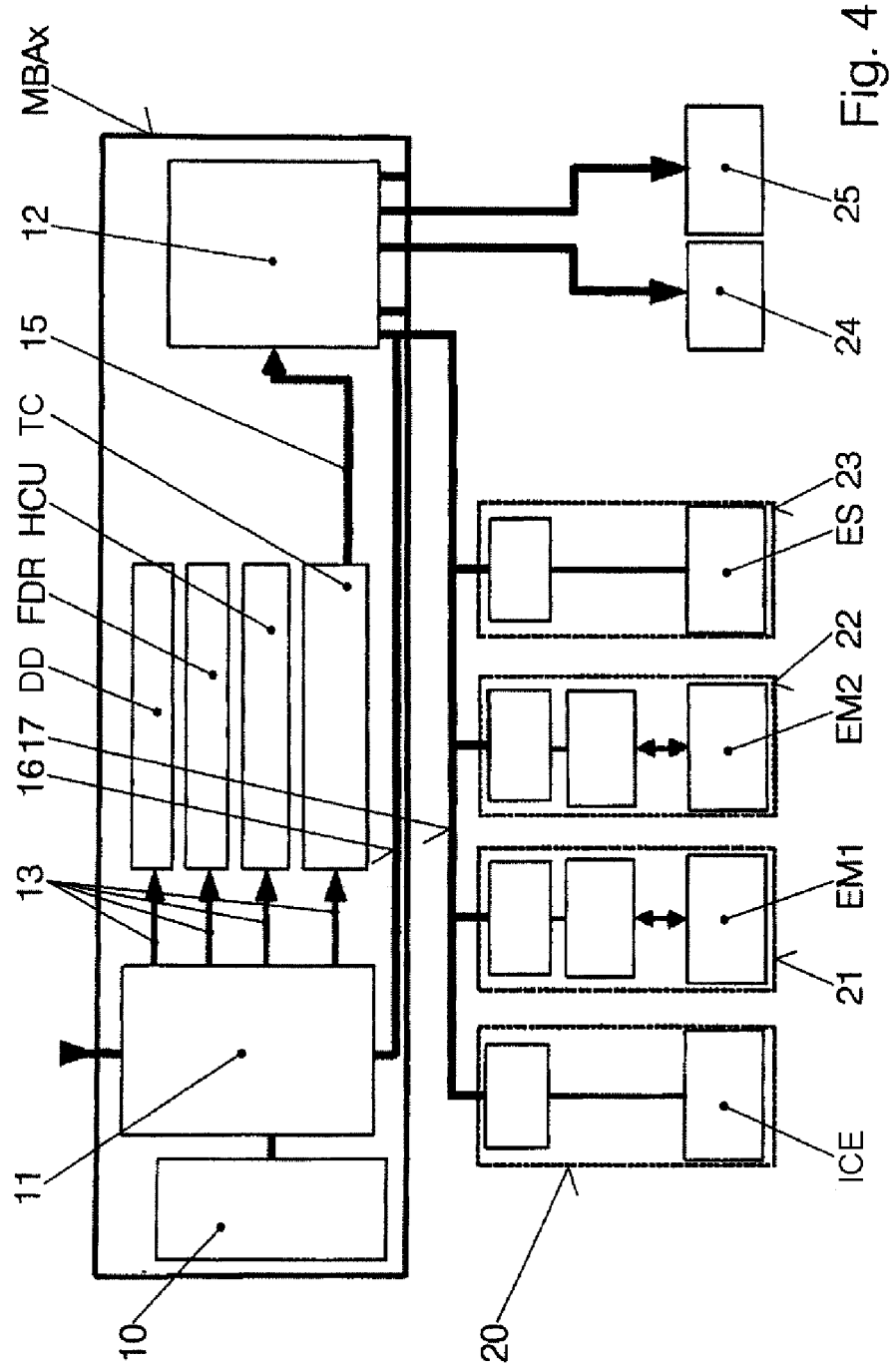
FIG. 4 shows a rough schematic diagram of the control according to the invention.

FIG. 4 illustrates the control unit MABx in terms of its system architecture. Characteristic maps, transmission ratios and further fixed variables are stored in a memory (not illustrated). This is also true of the parameters that can be selected for adaptation to a certain vehicle. The control unit MABx comprises an interface 10 to the CAN bus of the vehicle, a conditioning unit 11, with driver stages, for the input variables (sensor signals from the components) that describe the operating state and/or the system state, a conditioning unit 12, with a power section and driver stages, for the output variables, signal connections 13 from the conditioning unit 11 to the driver demand evaluation DD, to the driving dynamics controller (FDR), to the hybrid controller unit (HCU) and to the torque coordinator TC. From the latter, the actuator activation signals are supplied on the path 15 to the conditioning unit 12. Further data from the conditioning unit 11 is supplied to the conditioning unit 12 on the path 16. The conditioning unit 12 outputs commands to the activation 24 of the transmission ST and to the activation 25 of the clutches C1 to C4, and is connected by means of a further bus, the hybrid CAN bus 17, to the components—units of the hybrid drive. Said units 20 to 23 are composed in each case of the components ICE (assembly 20), EM1 (assembly 21), EM2 (assembly 22) and ES (assembly 23) and the control units, inverters and diagnostic or monitoring units thereof.

Figure 5:
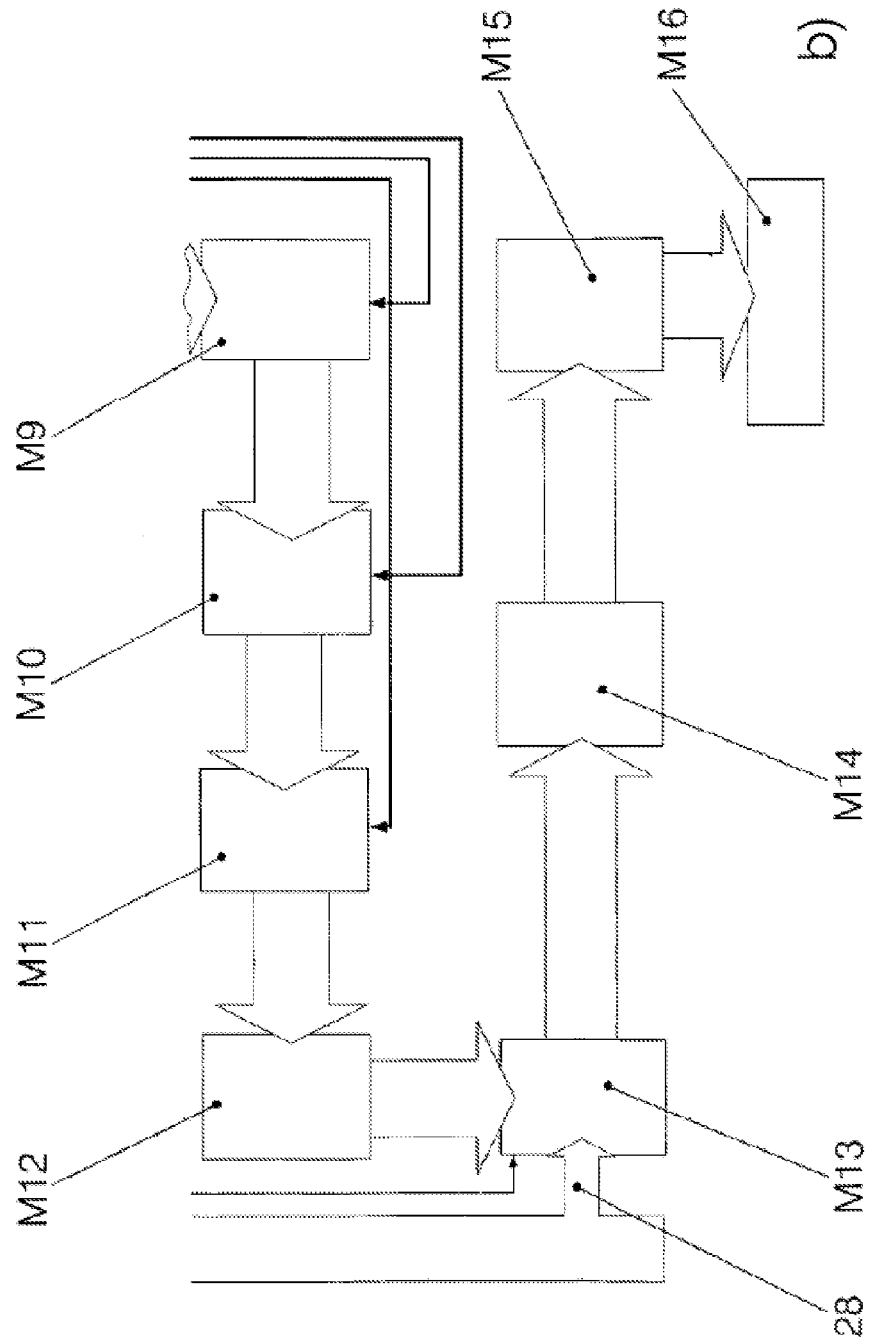
FIG. 5 shows a block diagram of the control according to the invention, divided into FIG. 5a and FIG. 5b.

FIG. 5 shows a flow diagram of the entire control of a drive according to FIG. 2 in the hybrid controller HCU, on the basis of which the control method according to the invention will also be described. Said control method is broken down into modules (denoted by a capital letter M and by continuous numbering from 1 to 16) and blocks within the modules, wherein the modules and blocks that are listed below and described in detail further below should be understood as imaginary units with a certain function in the repetitively executed program:

The driver demand block DD which does not belong to the hybrid controller HCU determines, from the driver inputs via the throttle and brake pedals, the torque to be applied to the road (referred to hereinafter merely as "torque"), which may be positive, negative (braking) or zero (coasting), and supplies said torque on the path 27 to the modules M2, M3, M7 and M8.

The driving dynamics controller block FDR is also connected upstream of the hybrid controller HCU and, if required, influences the torques determined from the driver demand DD by carrying out a traction intervention in the event of wheel slip, and in particular in a vehicle with two driven axles, also by intervening in the torque distribution between the axles RA, FA.

Module 1: The system state analysis module (SSA) M1 receives operating data of the vehicle and of the components in present operating states, carries out preparatory calculations (for example the machine rotational speeds), and provides these to the modules M2 to M8 via the path 28.

Module 2: the axle torque converter (AMK) M2 compiles the possible operating modes (AMK) (see table as FIG. 3) of the hybrid drive on the basis of the driver demand DD and any specifications by the driving dynamics controller.

Module 3: the component availability module (CA) M3 is a first filter stage in which those modes AMK which involve components that are not available or not available to a sufficient degree, or which do not meet certain strategic specifications, are eliminated.

Module 4: in the case of a multi-step transmission, the gear pre-selection module M4 identifies, on the basis of the transmission ratios and the rotational speeds, all the transmission gears G, that are possible for the modes AMK that have not been eliminated by the component availability. Said gear pre-selection module M4 therefore forms a number of modes AMGK which is greater than the number of modes AMK.

Module 5: the heat management module M5 calculates the maximum and minimum powers of the machines ICE, EM1 and EM2 by means of data from the system state analysis (module 1).

Module 6: the charge management or state of charge (SOC) module M6 calculates the charging power limits of the battery (ES) by means of data from the system state analysis (M1) and/or state variables of said battery (ES). The discharging power of the battery is controlled by the following module (7).

Module 7: the dynamics management (DM) module M7 determines torque limits from the power limits determined in modules 5 and 6. Said module M7 therefore specifies the range of operating point optimization and efficiency calculation in the following module (8). Said module M7 intervenes in the torque limits in order to fulfill the driver demand with regard to dynamics while protecting the battery (ES) to the greatest possible extent.

Module 8: the operating point optimization/efficiency calculation module M8 is composed of the two sub-modules of operating point optimization and efficiency calculation, which interact with one another, for the modes AMGK identified from the gear pre-selection, taking into consideration data of the system state analysis (module 1) and the torque limits determined in module 7.

Module 9: the charging state evaluator module M9 evaluates the modes AMGK identified from the gear pre-selection, with their operating points determined in module 8, on the basis of the charging limits determined in module 6.

Module 10: the heat evaluator module M10 evaluates the modes AMGK identified from the gear pre-selection (module M4), with their operating points determined in module M8, with regard to thermal loading.

Module 11: the dynamics evaluator module M11 evaluates the modes AMGK identified from the gear pre-selection (M4), with their operating points determined in module M8, on the basis of the torque limits determined in module 7.

Module 12: the overall evaluation module M12 merges the value grades from the modules 8, 9, 10 and 11 to form an overall value grade.

Module 13: the comfort filter M13 evaluates the modes AMGK identified from the gear pre-selection (module 4) and filtered in the subsequent modules with regard to driving comfort, and if appropriate, eliminates further modes AMGK.

Module 14: the sorter module M14 sorts the modes AMGK according to their overall evaluation determined in module M12, which also includes the overall efficiency.

Module 15: the status machine module (AMK) receives from module M14 the list of modes AMGK, sorted according to evaluation and efficiency, and selects the mode AMGK* that is placed uppermost in the sorter as the mode AMGK to be set. Said module M15 also prepares the interfaces to the following module.

Module 16: the torque coordinator module (MK) performs the transition from the present mode AMGK to the mode AMGK* to be set.

Below, a description is given of the individual modules and their mode of operation:

Module 1: System State Analysis (SSA) M1

Figure 6:
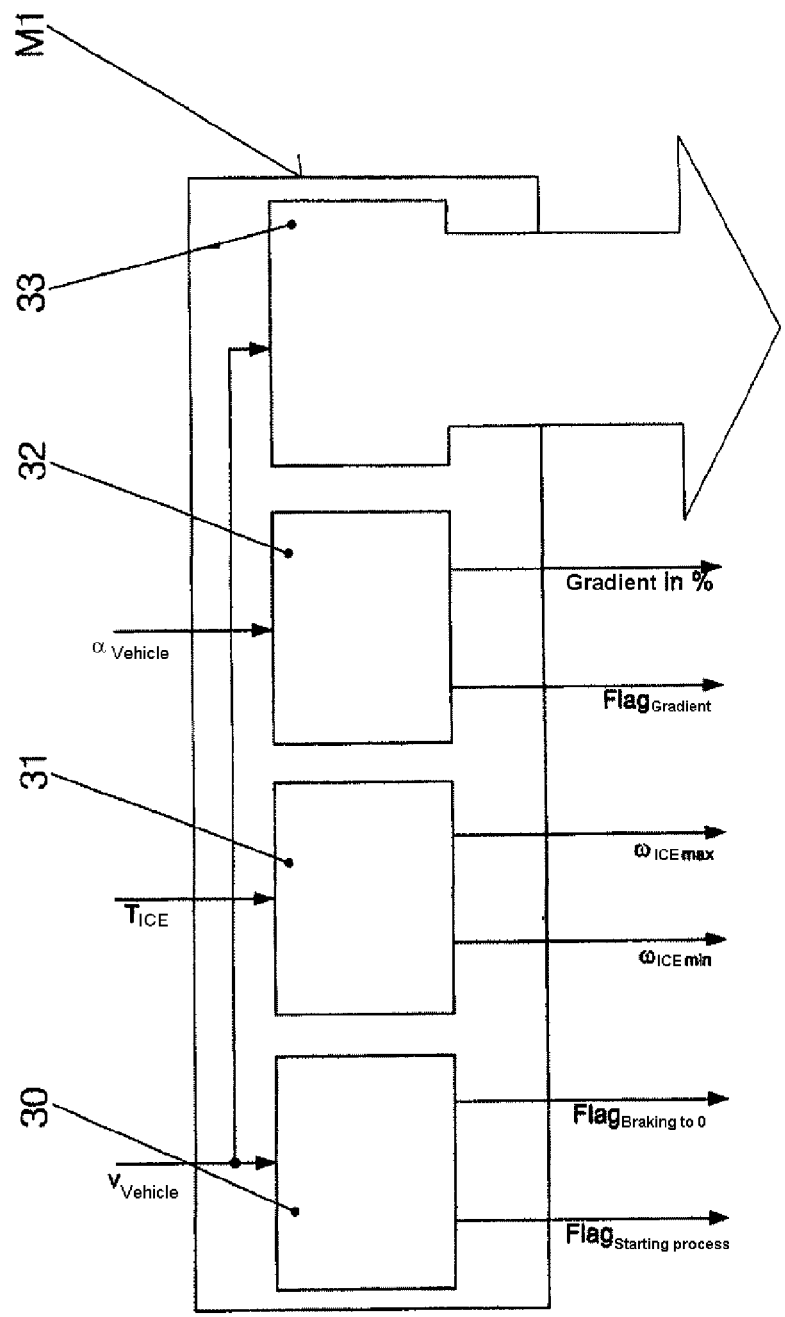
FIG. 6 shows a block diagram of module 1 in FIG. 5.

FIG. 6 shows the schematic layout of the system state analysis module M1. Said module M1 is composed of individual function blocks. A block 30 generates, on the basis of the speed of the vehicle $v_{Vehicle}$, a starting flag $Flag_{Starting}$ and a braking flag $Flag_{Braking}$. This is intended to indicate, at very low speed, whether the vehicle is starting or is being braked to a standstill. Said flags are used in a later module to select a fixed operating strategy if no correct operating point can be calculated on account of the low rotational speeds of the machines.

The block 31 "Specification of the minimum and maximum rotational speed of the internal combustion engine" is intended to specify the minimum rotational speed ($\omega_{ICEMin}$) and the maximum rotational speed ($\omega_{ICEMax}$) of the internal combustion engine (referred to for short as ICE below) as a function of the temperature $T_{ICE}$. Said specification is intended to prevent very low and very high rotational speeds of the ICE at low engine temperature during the further course of the method.

The block 32 "Gradient detection" determines the gradient on which the vehicle is presently traveling, in percent, from the acceleration of the vehicle $a_{Vehicle}$ and from the acceleration due to gravity, and outputs a flag for the detection of a gradient $Flag_{Gradient}$.

The block 33 "Calculation of the machine rotational speeds" calculates the expected rotational speeds of the electric machines EM1, EM2 and of the ICE that would occur in each mode AMGK at the present speed of the vehicle in the respective transmission gear. To obtain a correct speed signal, a speed signal that is substantially independent of slip is generated from all four wheel speed signals.

The overall transmission ratios ($\ddot{U}_{ST_i}$) in the individual gears $G_i$ and the clutch positions must be taken into consideration in the calculation of the machine rotational speeds ($\omega_{ICE}$, $\omega_{EM1}$ and $\omega_{EM2}$). In the table (FIG. 3), these are:

Clutch position A: C1 and C2 closed, C3 and C4 open,
Clutch position B: C1 and C3 closed, C2 and C4 open,
Clutch position C: C2 and C3 closed, C1 and C4 open,
Clutch position D: C1, C2 and C3 closed, C4 open.

The rotational speed of the electric machine 1 EM1 $\omega_{EM1}$ is calculated, according to the clutch position, from the vehicle speed $V_{Vehicle}$ and the transmission ratios $\ddot{U}$ set in each case between the wheel and the electric machine EM1. For example, in clutch position B or D:

$$\omega_{EM1} = \ddot{U}_{ST} \times \ddot{U}_{RAD} \times (v_{Vehicle}/r_{Wheel}).$$

Since said calculation of the machine rotational speeds takes place before the determination of the operating point, for all of the modes AMGK without a connection to one of the axles and with positive power of the ICE, it is not possible to determine a rotational speed for the electric machine EM1 and for the ICE.

Module 2: Axle Torque Converter (AMK) M2

Figure 7:
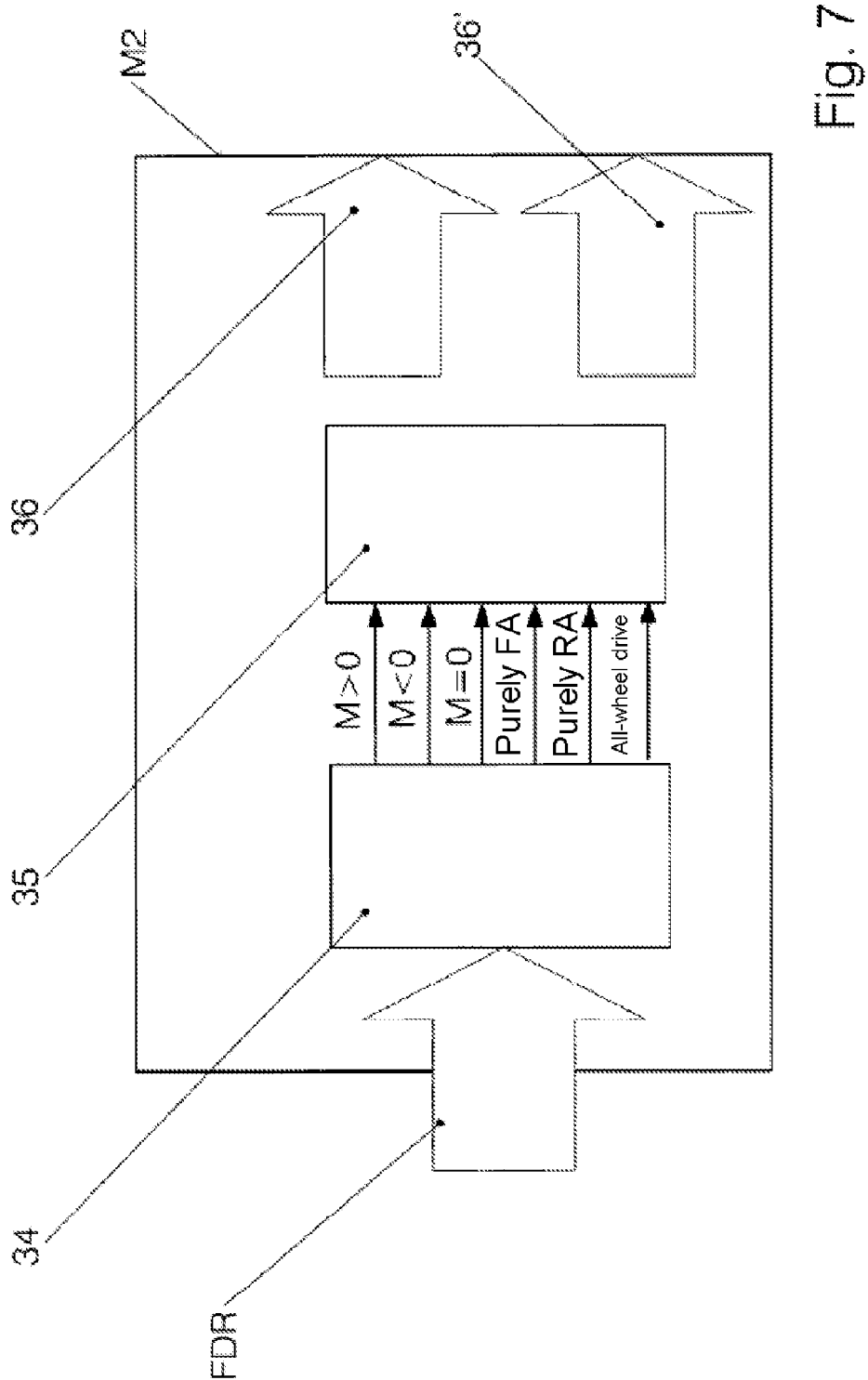
FIG. 7 shows a block diagram of module 2 in FIG. 5.

The axle torque converter module in FIG. 7 is connected at the input side to the driving dynamics controller FDR, which provides the axle torques $M_{FA}$ and $M_{RA}$ and, if appropriate, carries out a traction intervention. Said axle torque converter module M2 comprises two blocks: "torque evaluation logic" 34 and "KO filter" 35. "KO" stands for "knock-out", that is to say all the modes AMK that do not correspond to the torque demand (see the column "axle torque" in FIG. 3) are eliminated.

The "torque evaluation logic" block 34 firstly categorizes the axle torque specifications, or front axle torque and rear axle torque ($M_{FA}$, $M_{RA}$) of the driving dynamics controller according to the sign (+, − or 0) of the total axle torque ($M_{FA}$ $M_{RA}$) and, if a traction intervention TI of the driving dynamics controller FDR is present (signal TI=1), additionally according to the driven axles. The sign of the total axle torque and therefore the basic category (positive=1, negative=2, zero=3) is available as a signal to the subsequent modules. In the sub-functionality "driven axle" (only FA, only RA, all-wheel drive), it is necessary to make a distinction according to the presence of a traction intervention by the driving dynamics controller:

In the event of a traction intervention by the driving dynamics controller (flag TI=1), the further sub-categorization takes place according to the driven axle (only front axle, only rear axle or all-wheel drive, see FIG. 3). The sub-category is likewise provided as a signal to the subsequent modules.

If no traction intervention by the driving dynamics controller is present (flag TI=0), only the total axle torque ($M_{FA}$+$M_{RA}$) is considered. In this case, no further sub-categorization is necessary, since the module M8, which is run through at a later time, distributes the total axle torque ($M_{FA}$+$M_{RA}$), which is demanded by the driving dynamics controller, between the two axles in an energetically optimized fashion.

The "knock-out switch AMK" block 35 has the task of carrying out, with the information from the block 34 (total axle torque and driven axle(s)), a pre-selection of the possible modes AMK for the demanded axle torques. In the functionality of the knock-out switch AMK, a distinction is made according to the presence of a traction intervention by the driving dynamics controller.

If no traction intervention is present (flag TI=0), the expedient modes are selected on the basis of the total axle torque ($M_{FA}$+$M_{RA}$) and the basic category (1, 2 or 3) of the total torque indicator. If a traction intervention is present (flag TI=1), it is additionally necessary for the sub-category of the driven axle to also be taken into consideration in the selection.

At this juncture, it should be explained that, in the entire description, the instantaneous variables (operating state) are referred to explicitly as "present". All variables that are not denoted as "present" are the variables that are ultimately set at the components after the run-through of the described method. The variables and flags assigned to the individual modes run through the individual modules in each case as a packet. This may be configured or programmed in various ways. A suitable tool, which is used in the present exemplary embodiment, is "SIMULINK"®, which provides the arrangement of the data in a matrix; in the present application, this is a mode AMGK matrix, which Simulink can link with vectors 36, in the present example with a mode AMK vector, a gear vector, a knock-out vector etc.

The knock-out vector of the actual mode AMK or actual mode AMGK, that is the present mode AMK or mode AMGK of the previous clock step, is provided by the state machine module 15 (M15).

Module 3: Component Availability (CA) M3

Figure 8:
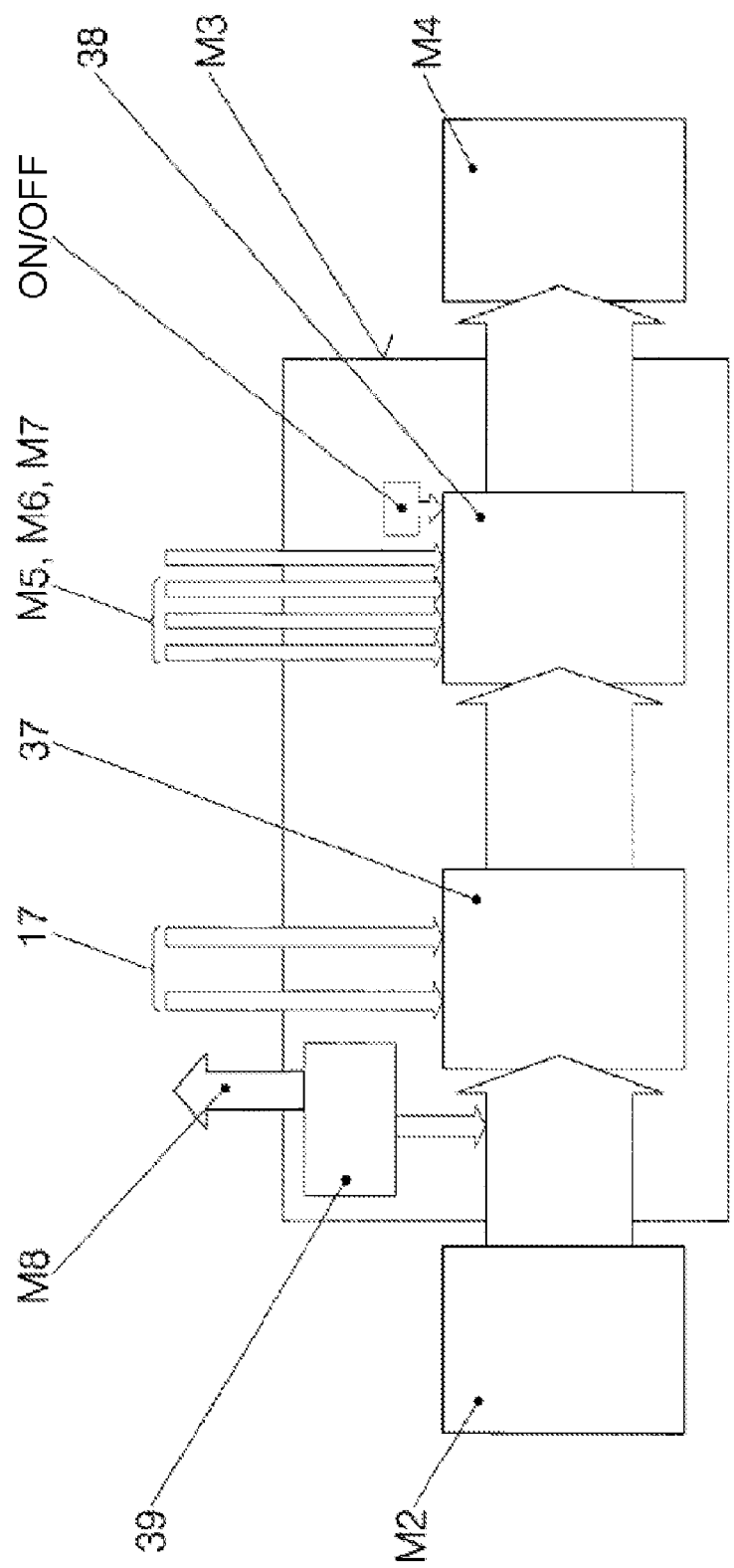
FIG. 8 shows a block diagram of module 3 in FIG. 5.

The "component availability" module (CA), illustrated by FIG. 8, is intended to eliminate, from the modes (AMK) selected by the "axle torque converter" module 2, those modes that cannot be realized from the aspect of the availability of the components. The present state of the respective components is signaled via the "torque coordinator" module (module 16) or via the hybrid CAN bus 16. The component availability module M3 is composed of two blocks, a "filtering according to availability of the components" block 37 and a "filtering according to strategy" block 38, and here, comprises a further "torque restriction" block 39, which could also be accommodated another module.

The aim of the "torque restriction" block 39 is to determine the maximum torque that can be converted for each gear stage at the input of the transmission or of the rear axle (rear axle differential) and provide said value to the module 8. With said limit torque, it is ensured that the machines (ICE, EM1, EM2) in the drivetrain of the rear axle RA are not destroyed by overloading. Here, on account of the mechanical configuration, no torque restriction is required at the front axle, which is likewise driven in the described exemplary embodiment.

The maximum torques, determined by the mechanical configuration, for the rear axle differential RAD and the shift transmission ST are stored in the memory (not illustrated) as fixed variables. The maximum rear axle differential torque is calculated back to the transmission input side via the gear transmission ratios. Said calculated torque is then compared with the maximum input torque of the shift transmission (ST). Said limit torques for each transmission stage are written into the mode AMGK matrix.

The availability information of each component is signaled to the block 37 via the hybrid CAN bus 17 from the separate state analyses of the individual assemblies 20-23 (see FIG. 4) and of the clutches C1 to C4 (see FIG. 2). A KO vector is formed from the evaluation of the availability signals of the components (ICE, EM1, EM2, ST, C1, C2, C3, C4, ES) and a further, temporary availability signal of the drive components ICE, EM1, EM2 from the torque coordinator module M16. The component availability module carries out filtering on the basis of the KO vector.

The "filtering according to strategy" block 38 comes into effect whenever high-priority clear decisions must be made regardless of the evaluation of the modes. This may include, for example, the targeted prevention of the shut-down of the internal combustion engine on account of decisions by the modules M5, M6, M7 (heat management, SOC, dynamics).

Figure 9:
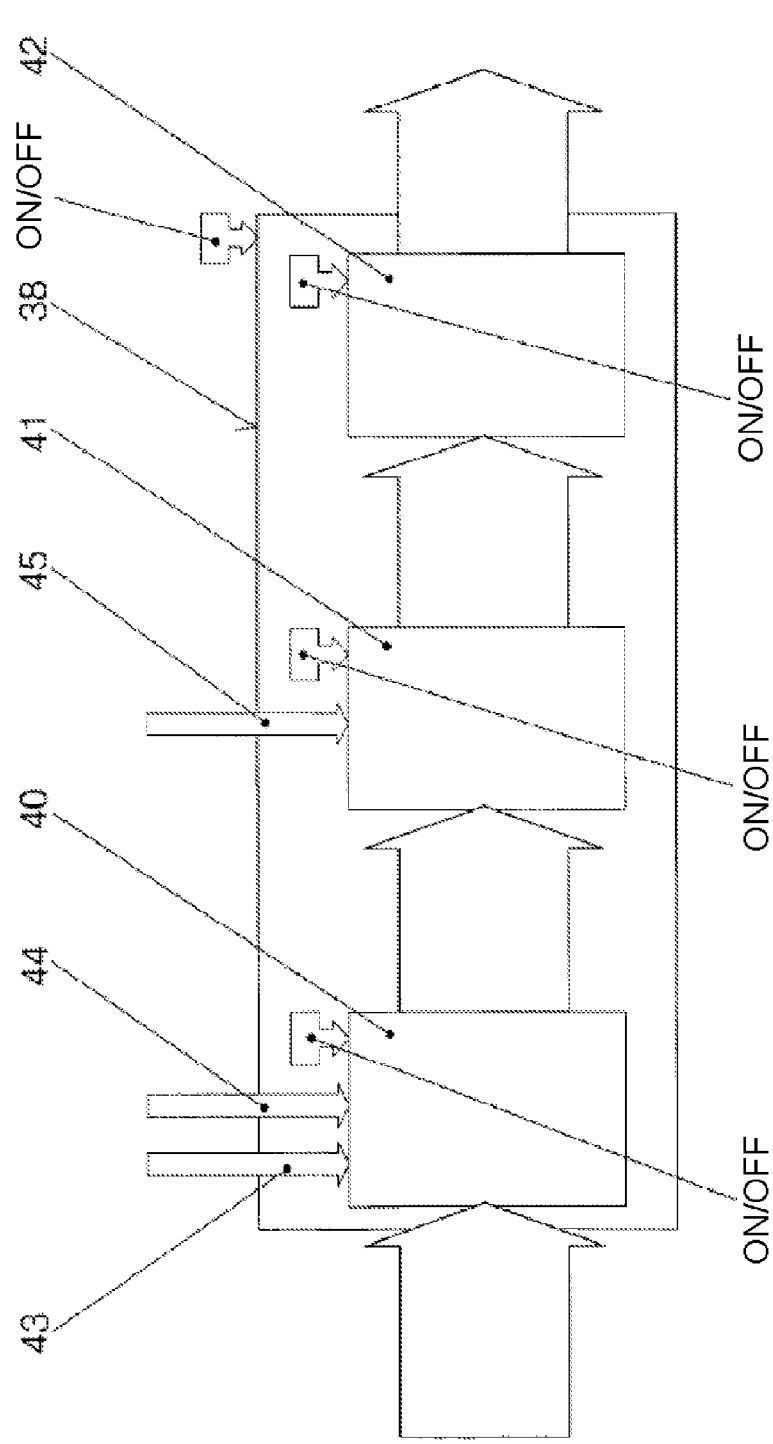
FIG. 9 shows a detailed block diagram of FIG. 8.

FIG. 9 shows the "filtering according to strategy" block 38 in detail. Said block 38 comprises the "filtering according to internal ICE start-stop" sub-block 40, the "filtering according to kickdown flag" sub-block 41 and the "filtering according to desired mode AMGK" sub-block 42, which respond to an "internal combustion engine start-stop flag" (40), a "kickdown flag" (41) and a desired mode AMGK (42). In detail:

a) Filtering According to Internal Combustion Engine Start-Stop Flag

The sub-block 40 receives, from the dynamics management module (module 7), the start-stop flag 43 (Flag$_{StartStop}$) and a signal "Status ICE" 44. Filtering of the modes AMK in question takes place taking into consideration said flag and the present state of the ICE (started/shut down). The ICE start-stop signal is used in the component availability module (M3) as an elimination criterion. The criterion is: if a mode of the modes AMK infringes the ICE start-stop condition, said mode is filtered out of the modes AMK. To decide whether or not the ICE should be shut down at idle, the module M3, in the event that Flag$_{StartStop}$=0, filters out only those modes AMK that would shut down the ICE at idle.

b) Filtering According to Kickdown Flag

A kickdown may be provided by the driver while driving whenever increased performance of the components is demanded even with regard to dynamics. The sub-block 41 then receives, from the dynamics management module (module 7), a kickdown flag 45. In this case, all the modes in which the ICE does not act on the rear axle of the drivetrain are filtered out. For this purpose, a positive torque category must be specified (M>0) by the axle torque converter module (module 2).

c) Filtering According to Desired Mode AMK

The sub-block 42 offers the driver the option of selecting certain modes in a targeted fashion taking into consideration various restrictions. For this purpose, the corresponding KO vector is selected and brought into effect. If no filtering is to take place, the block 42 may be deactivated by means of a corresponding parameter.

Module 4: Gear Pre-Selection M4

Figure 10:
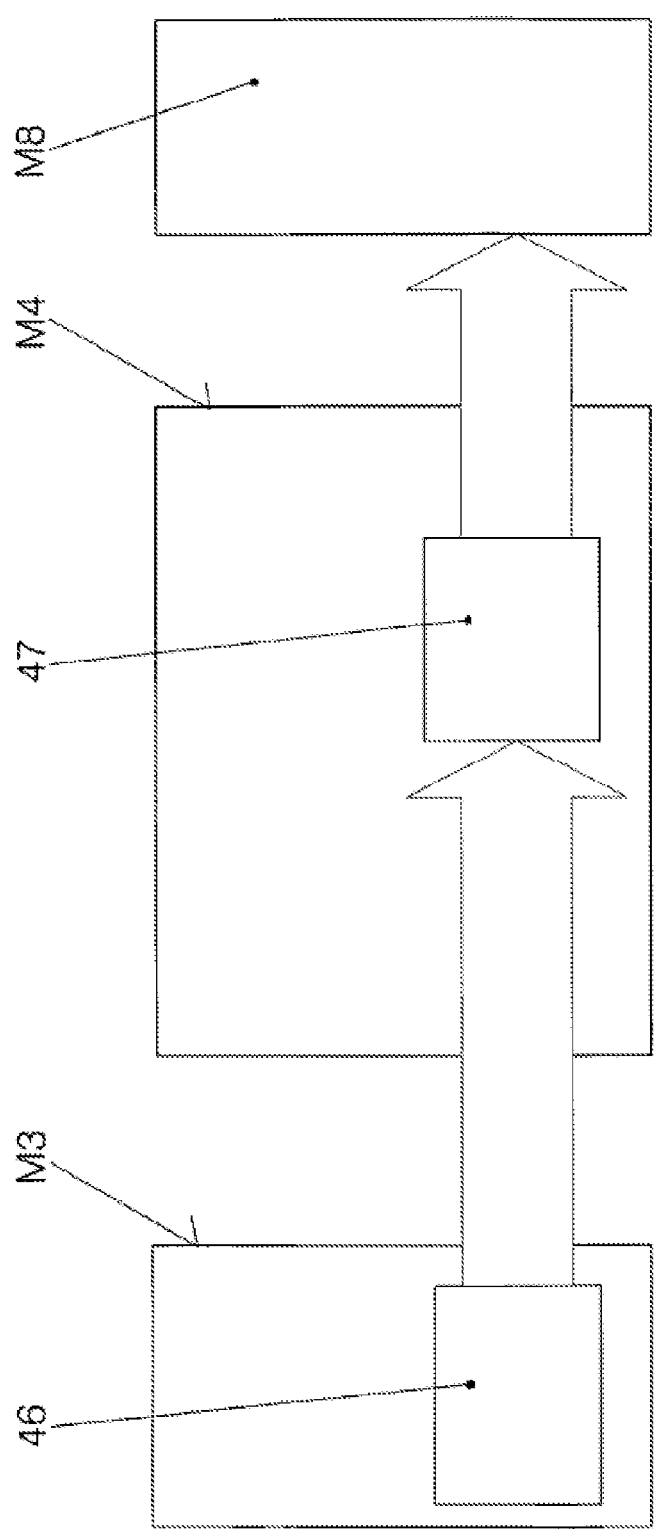
FIG. 10 shows a block diagram of module 4 in FIG. 5.

It is the aim of the gear pre-selection to additionally identify all the possible gears for the modes AMK graded as being possible by the component availability module (M3). In the further course of the filter chain, only those modes AMGK of a set of modes AMK that constitute possible gear stages are processed further. The module M4, illustrated in FIG. 10, is connected at the input side to the component availability module M3 and comprises a block 47 that applies a rotational speed condition to the modes AMK pre-filtered by the module M3 and that transmits the modes AMGK that satisfy said condition to the module M8. For this purpose, firstly seven mode AMK groups are defined, which groups are then processed differently in the gear pre-selection. The modes (see FIG. 3, "AMK") of a mode AMK group are processed in the same way with regard to the gear pre-selection. For illustration, the clutch positions A, B, C and D are defined further above.

By way of example, in the following mode AMK groups, the following rotational speed conditions apply:

Group 1—ICE Operation (AMK: 1, 2, 28-30, 34-36)

The gears must imperatively be designed for the rotational speed range of the ICE.

Rotational speed condition: $n_{ICEMin} < n < n_{ICEMax}$

Group 2—ICE Adaptation (AMK: 14, 17, 20, 21, 31)

Clutch position B: coupling of the ICE is probable.

Clutch position C: the gear may be provisionally selected for operation of the ICE. Since C1 is open, the transmission input is unloaded and a shift process is therefore imperceptible.

Rotational speed condition: $n_{ICEMin} < n < n_{ICEMax}$

Group 3—TowStart Adaptation (AMK: 3, 6, 10)

The internal combustion engine is not in operation. Clutch position B. The electric machine EM1 is operated as a motor or as a generator. The gear selection provisionally selects a gear that enables the vehicle to perform a towing start (TowStart) in which the rotational speed of the ICE is close to the idle rotational speed. In the further groups, no calculation is necessary. The correct gear for the group is specified by means of the knock-out vector.

The ICE or the electric machine EM1 may be operated only in a limit rotational speed range. Only those modes AMGK that ensure that the transmission input rotational speed lies in said rotational speed range may be transmitted as modes to the subsequent modules. All the other modes are eliminated by means of the knock-out vector.

Module 5: Heat Management M5

The heat management module M5 has the task of eliminating, during the selection of the operating point, thermally undesired ranges of the hybrid components, and transmitting the electrical power limits of the electric machines EM1, EM2 and the thermally limited maximum power of the ICE to subsequent modules (in particular to module M10). The "start-stop flag" is formed in the heat management as an overlapping function.

Figure 11:
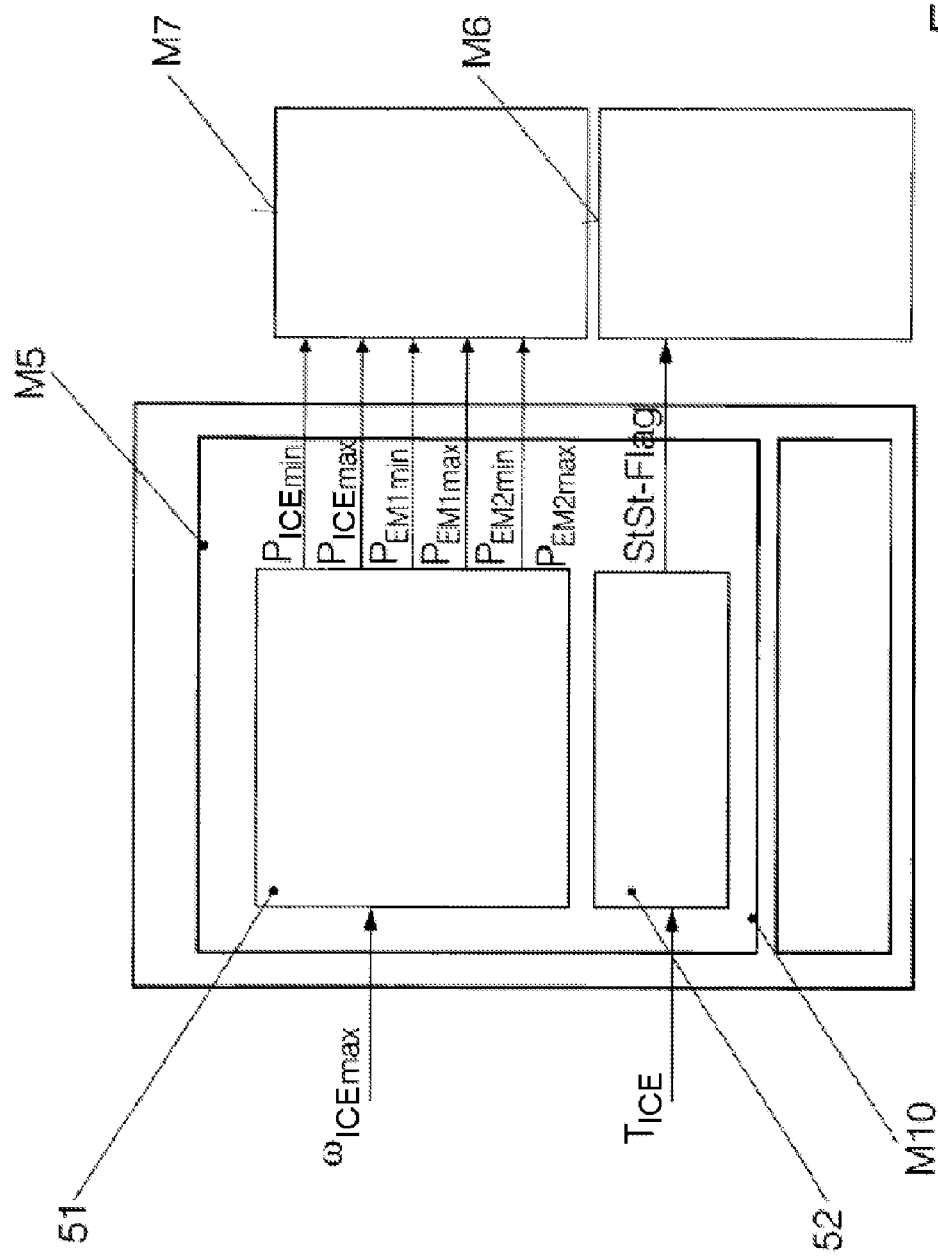
FIG. 11 shows a block diagram of module 5 in FIG. 5.

In FIG. 11, the module M5 comprises a "calculation of the machine power limits" block 51 and a "generation of the start-stop flag" block 52. The block 51 calculates the power limits of the ICE and of the electric machines EM1, EM2.

Calculation of the Power Limits of the Internal Combustion Engine

To calculate the upper machine power limits of the ICE, a rotational speed condition and a parameterizable maximum power are required, and a case distinction must be made between series and parallel modes. "Parameterizable" means "selectable for the respective application" (for adaptation to the respective vehicle).

a) Modes with Positive Nominal Torque of the ICE (Series=Isolated Operation=Ice Drives Only the Generator)

Since, in series operation (for example mode AMK 31, see table in FIG. 3), the rotational speed condition of the gear pre-selection module M4 does not intervene for excessively high rotational speeds, the heat management has the task of ensuring, for said modes, that the upper rotational speed limit calculated by the system state analysis module M1 is adhered to. The maximum power of the ICE is calculated from the rotational speed and from the torque of the strictly monotonously rising optimum line (from a superposition of the characteristic maps of the ICE and electric machine EM1) at the upper rotational speed limit of the internal combustion engine. The resulting maximum power is linked, with a minimum selection, with the temperature-dependent power $P_{ICEMax}$ from the system state analysis module M1.

b) Parallel Modes Independent of Nominal Torque (The Internal Combustion Engine is Connected to the Rear Axle)

In this case, the maximum power is the parameterizable power $P_{ICEMax}$ that is dependent on the temperature of the internal combustion engine. The power of the ICE results is given by the drag characteristic curve and the temperature-dependent maximum permissible rotational speed of the internal combustion engine $\omega_{ICEMax}$ as: $M_{ICEDrag\ max} = f(\omega_{ICEMax})$.

With the specification of a minimum power of the ICE $P_{ICEMin}$ as a lower power limit, the heat management module M5 may also restrict the drag operation and thereby prevent the ICE reaching an excessively high rotational speed in the overrun mode as a result of an excessively low gear. The minimum power of the ICE is calculated, for all modes, from the maximum negative torque in drag operation ($M_{ICEDragmax}$) and the temperature-dependent maximum rotational speed of the ICE. The maximum negative power of the internal combustion engine is therefore $P_{ICEMin} = \omega_{ICEMax} \cdot M_{ICEDragax}$ Calculation of the Power Limits of the Electric Machines (Em1, EM2)

Like the power limits of the ICE, the maximum and minimum power of the electric machines EM1, EM2 is also mode-dependent. In generator operation, the lower limit of the power (momentary or continuous power) is the maximum power in the traction mode of EM1, but converted to the generator range, and the upper limit is zero. In motor operation, the lower limit is 0 kW and the upper limit is the maximum power of the electric machine EM1.

The machine power limits calculated in block 51 will, in a subsequent module (M8: operating point/efficiency), restrict the range of the operating point optimization by setting power limits.

By setting the "start-stop flag" (block 52), the "start-stop" flag required for filtering the mode AMK list by the component availability module (module 3) is generated. Said flag has the following significance:

start-stop flag=1: ICE may be started and shut down as desired, start-stop flag=0: the ICE, having been started, may no longer be shut down. The start-stop flag is set by the block 52 if the temperature of the ICE lies below a parameterizable value. Said flag is used later by the heat management to prevent a shut-down of the ICE at an excessively low temperature $T_{ICE}$ of the ICE.

Module 6: Charge Management (SOC) M6

The charge management module ("state of charge"=SOC) ensures a regulated charging state of the battery (ES) by firstly specifying power limits of the battery to the dynamics management (M7) for certain modes AMK or AMGK, and secondly specifying the evaluation (to the SOC evaluator, M9) the data to be evaluated for the different modes AMK or AMGK according to their influence on a regulated charging state. Said module M6 also analyses the state of the battery.

The charge management module seeks to charge the battery when the latter is at a low charging state, and at a high charging state, continuously reduces the possible charging power. The SOC management controls only the charging power of the battery, but not its discharging power. The control of the discharging power of the battery is performed by the dynamics management (module 7). The charging limits of the battery are independent of the driving dynamics, whereas in contrast, the discharging limits of the battery are very much dependent on said driving dynamics (for example in a "boost" mode, in which an electric machine assists the ICE in order to obtain the maximum possible power, for example for an overtaking procedure).

A stored characteristic map for the charging state and charging power of the battery is divided into regions with respectively suitable charging power. Said characteristic map thus specifies an optimum range for the maximum service life of the battery ES and a prohibited range in which said battery is subject to damage, and intermediate zones. If the charging state falls below a parameterizable value, a start/stop flag is set (overlapping function). If said start/stop flag is set, a shut-down of the ICE is prevented.

Module 7: Dynamics Management M7

Taking into consideration the specifications of the management systems described above (SOC, heat, modules M5, M6), the dynamics management module M7 specifies the range of operating point optimization and efficiency calculation. Here, said module M7 actively intervenes in the torque limits in order to fulfill the driver demand with regard to dynamics and protect the battery. The dynamics management module M7 has the following tasks or peculiarities:

said module M7 has the highest priority of the management systems, said module M7 comprises a state analysis for power management and specification of machine torque limits, said module M7 takes the battery ES into consideration when specifying the torques of the electric machines EM1, EM2, and thereby increases the service life of said battery ES, said module M7 can dynamically shift torque limits (for example boost: more torque to the electric machines, since the nominal torque is attained more quickly electrically, then shifting the drive power to the ICE), said module M7 specifies, to the dynamics evaluator M11, the assessment criteria for the different modes AMK or AMGK according to their influence on the dynamics demand and battery service life, said module M7 takes into consideration the distribution of the available electrical power between the two electric machines EM1, EM2.

Figure 12:
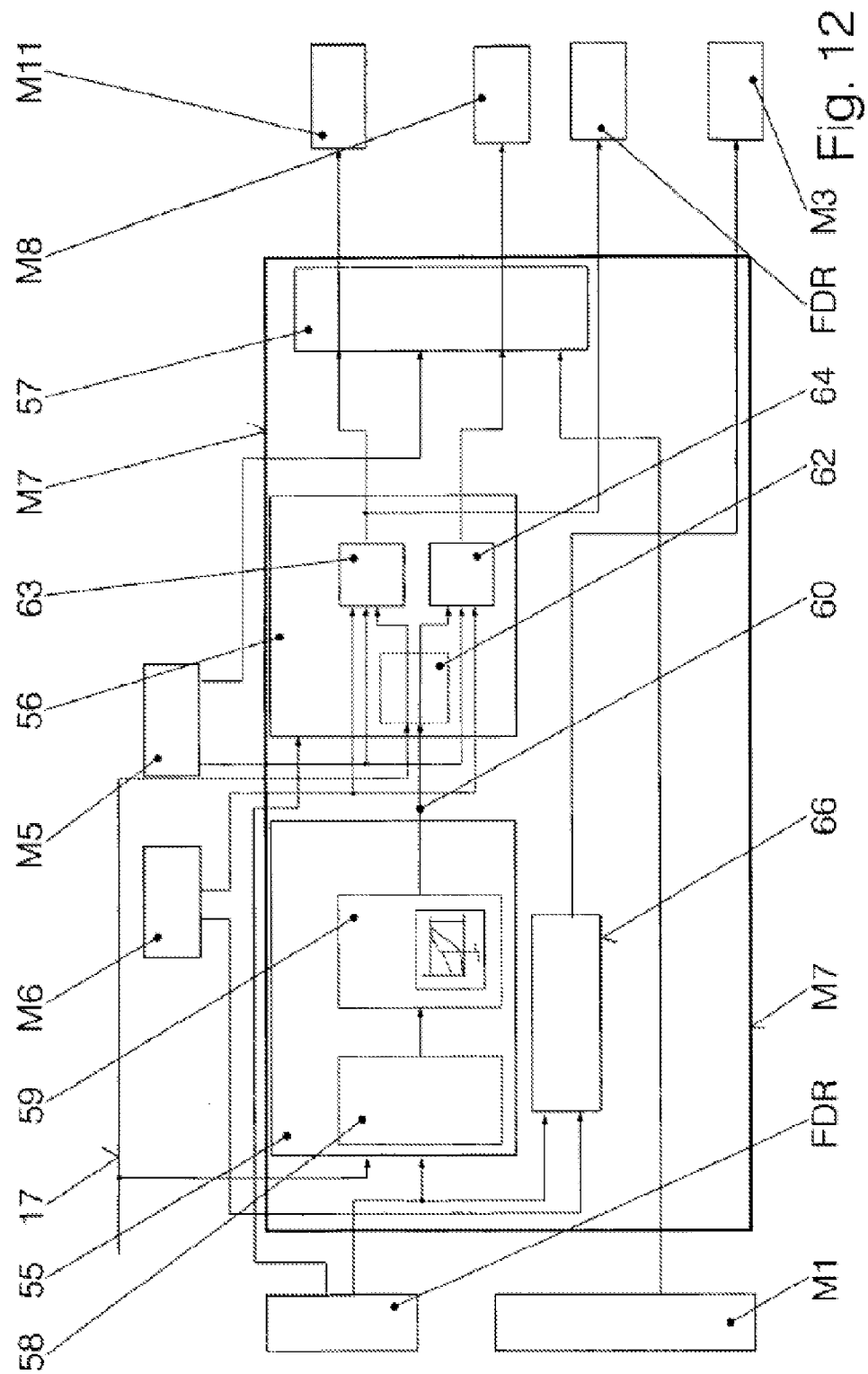
FIG. 12 shows a block diagram of module 7 in FIG. 5.

FIG. 12 illustrates the software structure of the dynamics management module (M7). The latter comprises substantially three blocks: a dynamics block 55, a collecting block 56 and a conversion block 57. The dynamics block 55 is connected at the input side to the driving dynamics controller FDR and via the torque coordinator M6, the conditioner 12 and the hybrid CAN bus 17 to the component units 21 to 23 (FIG. 4) and 25, 26, and to the battery ES. In the dynamics block 55, a sub-block 58 firstly calculates an electric dynamic factor $E_{Dyn}$ and, as a result, a sub-block 59 defines the dynamically corrected power limits of the battery ES, and provides said power limits to the collecting block 56 (line 60).

The electric dynamic factor $E_{Dyn}$ enhances the dynamic factor by taking into consideration the battery. Said electric dynamic factor $E_{Dyn}$ is always less than or equal to the dynamic factor from the driver demand evaluation DD. Only when the battery is in the ideal state for high discharging are both dynamic factors equal ($E_{Dyn}$=DynF).

Figure 13:
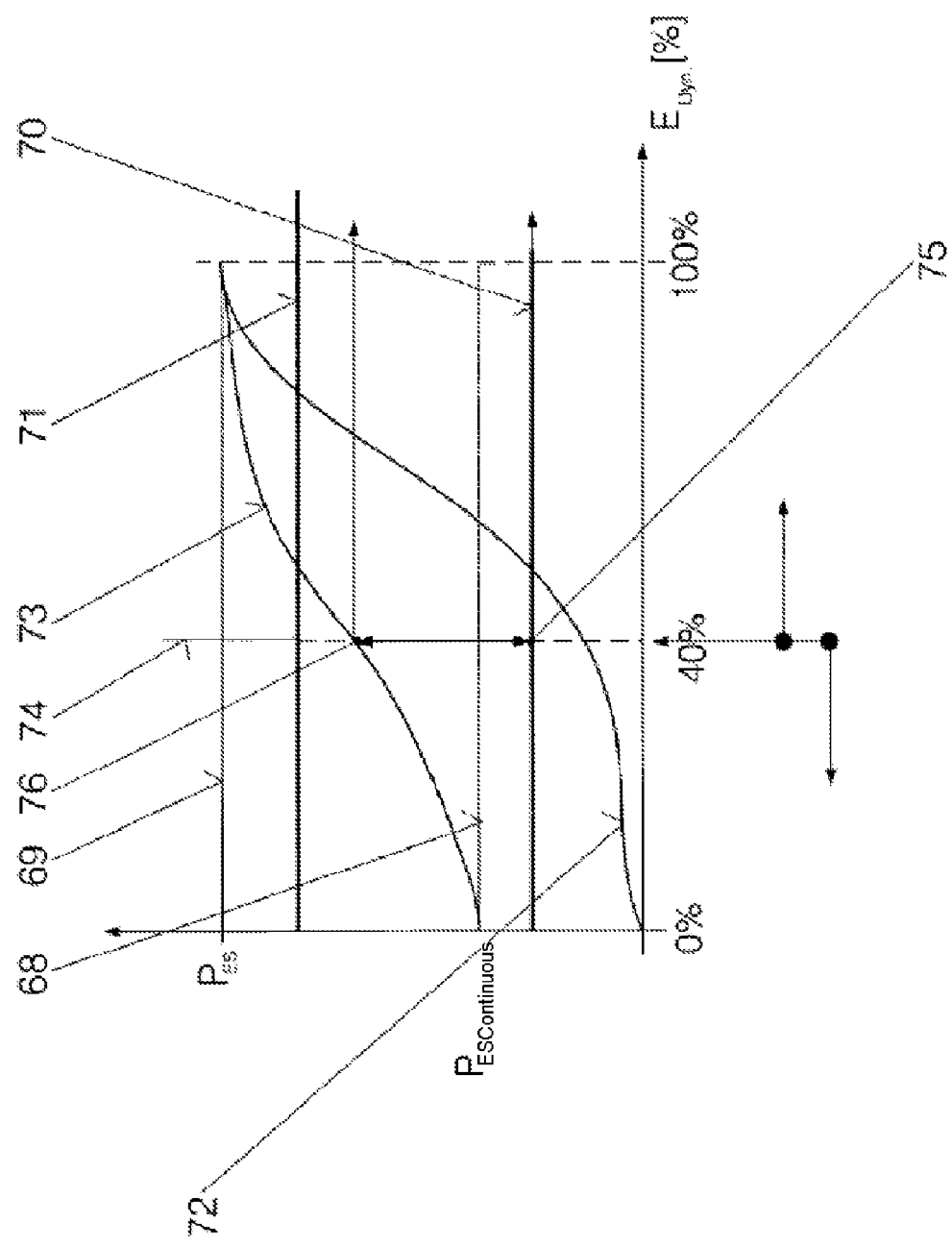
FIG. 13 shows a diagram relating to module 7.

FIG. 13 shows the limits of the power output by the battery ES and received by the electric machines (on the ordinate) as a function of the dynamic factor (on the abscissa), in other words as a function of the dynamics demand. The dynamic factor $E_{Dyn}$ lies between 0% (no dynamics demand, protecting the battery) and 100% (highest dynamics demand, even in the event of overloading of the battery). In the power limits of the batter, a distinction is made between a continuous power $P_{EScontinuous}$ (68) and a momentary power $P_{ESmomentary}$ (69) (plotted on the ordinate). Likewise plotted on the ordinate are the power limits of the electric machine EM1: $P_{EM1min}$ 70 and $P_{EM1max}$ 71. The characteristic curves 72, 73 take into consideration the load collective of the driver and the service life of the battery, with the former (72) ensuring a minimum in terms of dynamics and the latter (73) restricting the maximum battery power for the purpose of optimizing the service life of said battery.

In the case of a mean dynamics demand of 40%, the corresponding vertical straight line intersects the horizontal line 70, which corresponds to the minimum power of the electric machine EM1, at the point 75, and the dynamic characteristic curve 73 at the point 76. Said points correspond to the minimum and maximum dynamic power of the electric machine EM1, $P_{EM1minD}$ and $P_{EM1maxD}$. These are the power limits of said electric machine EM1 for the optimization of its operating point in the subsequent module M8.

In the collecting block 56 (again in FIG. 12), the different power limits are then merged, specifically: the dynamically corrected power limits of the battery (ES) from block 55, the thermal power limits of the machines (ICE, EM1, EM2) from module 5 and those from the charging state of the battery (ES) from module 6. In a sub-block 62, a distinction is made between dynamic power limits with or without the involvement of the driving dynamics controller (FD), and corresponding to said distinction, the power limits undergo a minimum selection in two sub-blocks 63, 64. The power limits are thus further restricted in the lower block 64, such that the dynamics demand is fulfilled while protecting the battery to the greatest possible extent.

The power limits are then converted, in the conversion block 57, into torque limits for the possible modes AMGK taking into consideration data and intermediate results from the system state analysis module M1. The power limit from the sub-block 63 yields the maximum torques for continuous power; the power limit from the sub-block 64 yields the maximum torques for momentary power. Said restricted limits are then specified, to the efficiency calculation in module 8, as limits for the optimization, and are also provided to the dynamics evaluator (M11).

The start-stop flag block 66 is influenced in this module by the driving dynamics controller FD and by the charging state (module 6), for example in order, when traveling on a gradient, to prevent a shut-down of the ICE, since high torques may be demanded quickly. The ICE is then not shut down.

Module 8: Operating Point/Efficiency Calculation

Figure 14:
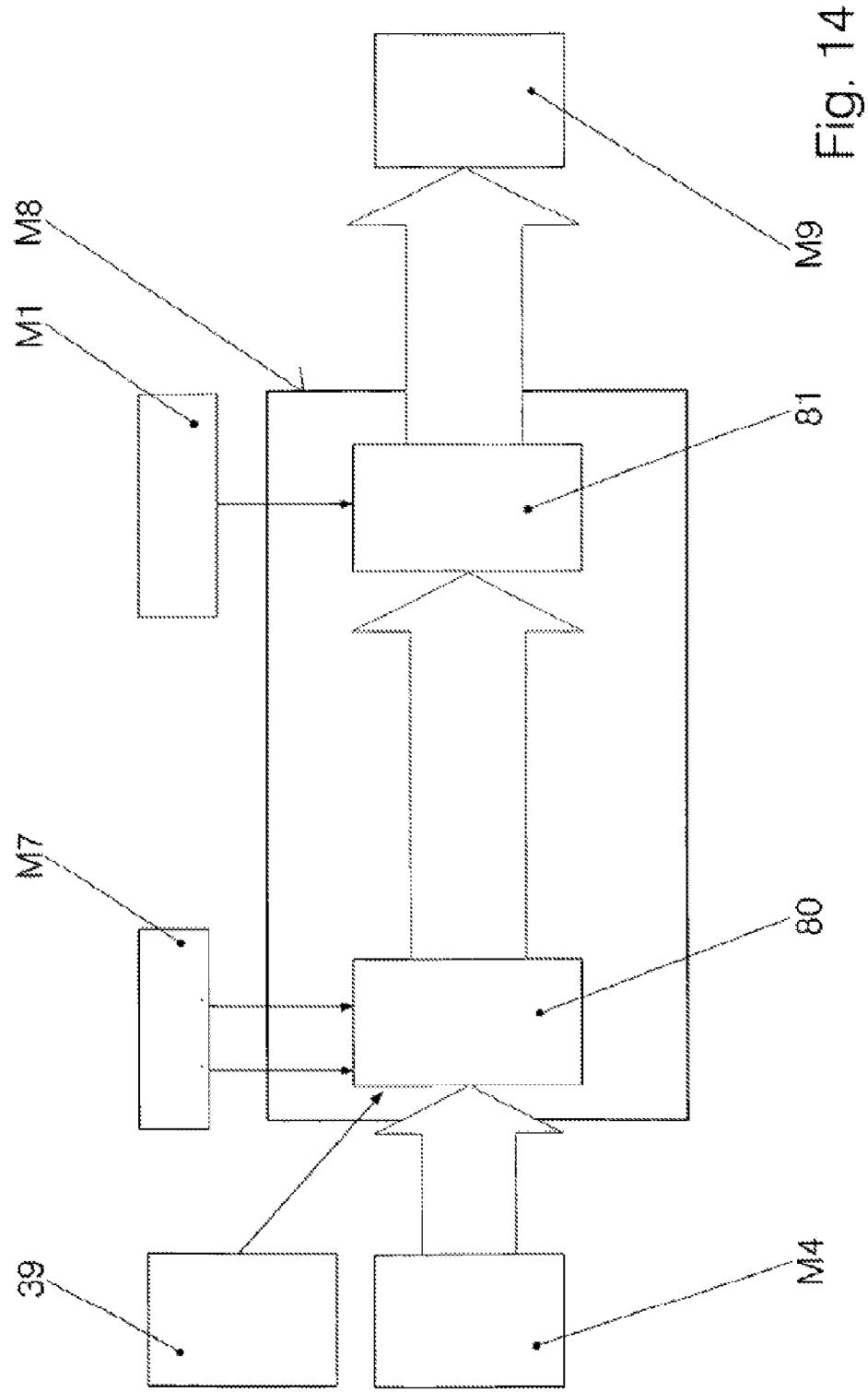
FIG. 14 shows a block diagram of module 8 in FIG. 5.

FIG. 14 illustrates the software structure of the efficiency calculation/operating point optimization. Precisely one local optimum operating point is determined for each mode AMGK. The module 8 is connected at the input side to the "gear pre-selection" module (M4) and receives further inputs from the system state analysis (M1), from the dynamics management (M7), and the mechanically-defined limit torques from the block 39 of the component availability module M3. The optimization takes place in two steps, "operating point determination" (block 80) and "efficiency calculation" (block 81).

1. Determination of the Operating Point

For each mode AMGK, that operating point of the three machines (EM1, EM2 and ICE) is determined which represents the best overall efficiency for the demanded torque distribution, as a function of an engagement of the driving dynamics controller FDR. The range in which the optimization takes place is specified by means of torque limits by the "dynamics management" (M7) taking into consideration the specifications of the heat management (M5) and charge management (M6), which have the physical limits. The torque limits from the component availability (transmission protection) are taken into consideration in the determination of the operating point. If the driver demand lies outside the range that can be realized, the maximum operating point that can be realized for the respective mode AMGK is determined.

The present rotational speed of the machines is generally determined by the present vehicle speed and the present gear stage, and is provided by the system state analysis (M1). The variation of the operating range takes place primarily by means of a redistribution of the torques between the machines. The torque distribution therefore defines the operating points in terms of torque and rotational speed. In exceptional cases (for example series operation), the rotational speed is first defined after the determination of the operating point.

To determine the operating point, firstly the modes AMK are categorized according to the torque distribution:

a) Only One Electric Machine EM is Activated; Ice is Shut Down or at Idle
for example: modes AMK 6/10/20/21 (see FIG. 3)
The electric machine torque for the activated electric machine corresponds to the driver demand torque; all other machine torques are zero.

b) Only the ICE is in Operation
Modes AMK 2/29 (see FIG. 3)
The ICE torque corresponds to the driver demand torque; all other machine torques are zero.

c) All-Wheel Drive Mode, and Two Machines are Activated
Modes AMK 1/3/13/33 (See FIG. 3), requires a case distinction:

c1) ICE and EM2 are Activated
Modes AMK 1/33 (see FIG. 3)

If a traction intervention by the driving dynamics controller (FDR) is present, the two axle torques and therefore also the machine torques are clearly defined. If no traction intervention by the driving dynamics controller (FDR) is present, the division of the torques between the ICE and the electric machine EM2 is variable; an optimization with regard to the best efficiency is possible by shifting the torques at a fixed rotational speed. The range of torque available for optimization (the rotational speed is fixed) is determined by the torque limits and by the transmission protection.

c2) EM1 and EM2 are Activated
(Modes AMK 3/13)
Mode AMK 3: charging the battery with both electric machines EM Said mode AMK is activated only by means of a traction intervention by the driving dynamics controller (FDR); the driving dynamics controller then also clearly specifies both axle torques and the machine torques are also clearly defined.
Mode AMK 13: purely electric all-wheel drive If a traction intervention by the driving dynamics controller (FDR) is present, the latter also clearly specifies both axle torques and therefore also the machine torques. If no traction intervention by the driving dynamics controller (FDR) is present, the division of the torques between the electric machines EM1 and EM2 is variable, and an optimization with regard to the best efficiency is possible by shifting the torques at a fixed rotational speed.

d) Only Torque at the Rear Axle, and ICE and EM1 are Activated and EM2 is Deactivated, Modes AMK 28/30 (see FIG. 3)

In this case, there is a demand for the entire driver demand torque to be provided at the rear axle. The division of the torques between the ICE and the electric motor EM1 is variable, and an optimization with regard to the best efficiency is possible by shifting the torques at a fixed rotational speed. The range of torque available for optimization (the rotational speed is fixed) is determined by the torque limits from the dynamics management (M7) and by the transmission protection of the component availability module (M3).

e) All-Wheel Drive Mode, and all Machines are Activated

Modes AMK 32/34; a case distinction is also made here e1) EM1 Operates as a Generator, ICE and EM1 in Motor Operation (Mode AMK 32)

Said mode AMK is activated only by means of a traction intervention by the driving dynamics controller (FDR), which specifies a clear distribution of the axle torques. The electric machine EM2 must provide the front axle torque; the distribution between ICE and EM1 is freely selectable. The optimization of the torque of the electric motor EM1 and of the ICE takes place as per d).

e2) All Three Machines in Motor Operation (Mode AMK 34)

If a traction intervention is present, the driving dynamics controller FDR clearly specifies both axle torques. The electric machine EM2 must provide the front axle torque; the distribution between ICE and EM1 is freely selectable. The optimization of the torques of the electric machine EM1 and of the ICE takes place as per d).

If no traction intervention is present, the division of the torques between ICE, EM1 and EM2 is variable. It is sought to realize the specifications of the driving dynamics controller (FDR) with the electric machine EM2, and the rest of the total torque is imparted by the electric machine EM1 and the ICE. An optimization with regard to the best efficiency is possible by shifting the torques between the ICE and the electric machine EM1 at a fixed rotational speed.

Figure 15:
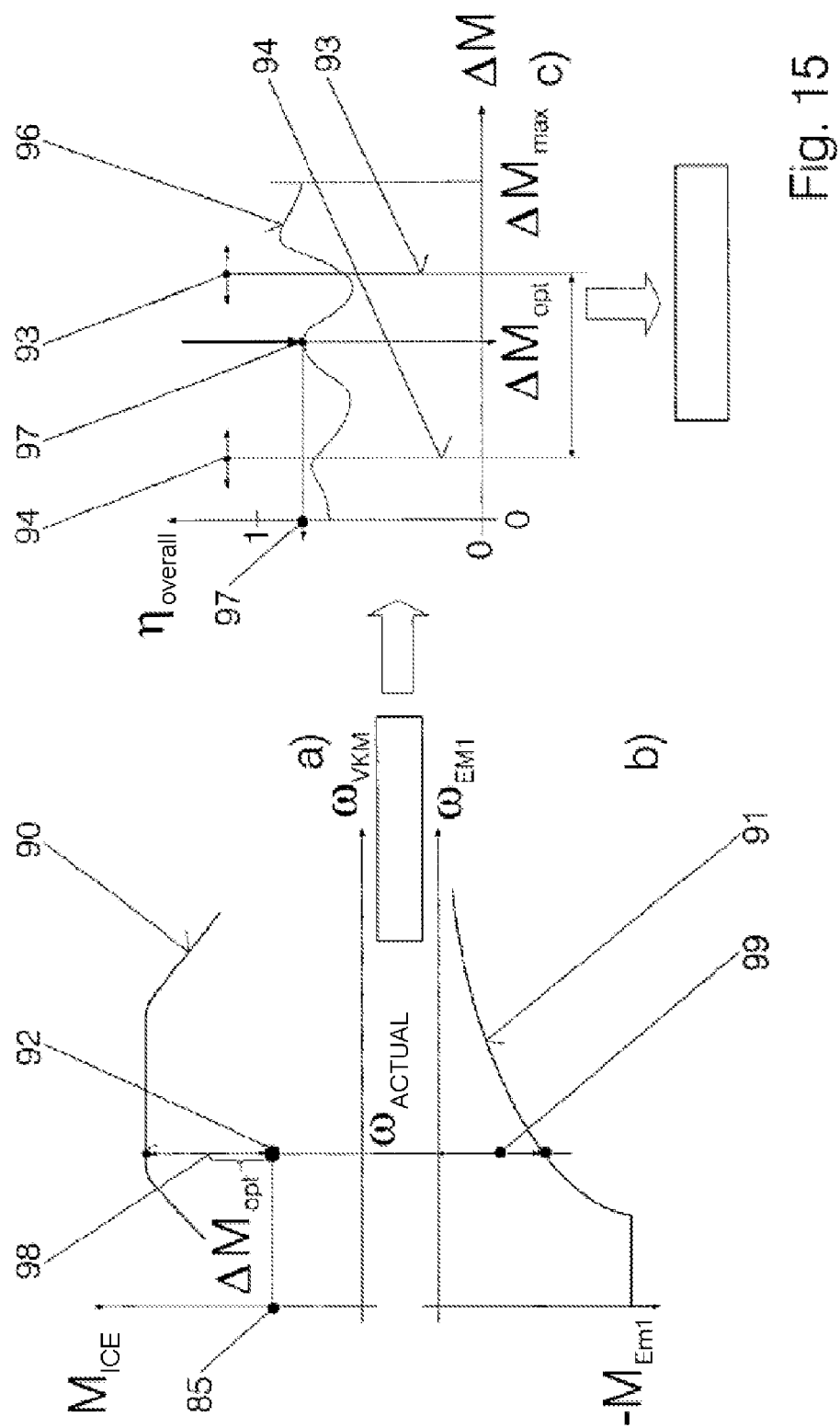
FIG. 15 shows diagrams a, b, c relating to module 8, determination of operating point.

A detailed description of the approach that is exemplary for determining the torque distribution with the optimum efficiency is given below on the basis of FIG. 15 and mode AMK 28 (ICE and EM1 driving the rear axle, EM2 is deactivated, purely rear-wheel drive). In this regard, FIG. 15 is composed of three diagrams: diagram a) shows the full-load curve 90 of the ICE (torque versus rotational speed), diagram b) shows the full-load curve 91 of the electric machine EM1, and diagram c) shows the efficiency on the ordinate versus the differential torque.

In a first step, the driver demand torque $M_{DD}$ is converted to the transmission input, is restricted with the maximum transmission input torque from the component availability module (M3), and is linked with the present rotational speed (driving speed) $\omega_{actual}$. This is point 92.

In a second step, the torque limits for the optimization of the efficiency are determined. The torque limits from the dynamics management M7 (full-load curves 90 of the ICE in FIGS. 15a) and 91 of EM1 in FIG. 15b)) describe the maximum torques $M_{ICE\_max}$, $M_{EM1\_max}$ of the machines for the present mode AMGK. The torque that can be output by the ICE over and above the driver demand $M_{DD}$ (the vertical distance between the point 92 and the curve 90) is the torque reserve of the ICE ($\Delta M_{MaxICE}$), a differential torque. If said differential torque can be imparted by the electric machine EM1, this is the upper torque limit $\Delta M_{Max}$ (see FIG. 15c) for the optimization. Otherwise, the torque reserve is reduced to the maximum torque of EM1 ($\Delta M_{MaxEM1}$).

The upper torque limit $\Delta M_{Max}$ is obtained by means of a minimum selection from the maximum torques ($\Delta M_{ICE\_max}$, $\Delta M_{EM1\_max}$) of the two machines for the present mode AMGK. The lower torque limit ($\Delta M_{Min}$) for the optimization is determined only by the minimum torque of the electric machine EM1, which is determined in the charge management module M6. These are the optimization limits $\Delta M_{Min}$, $\Delta M_{Max}$ (vertical straight line) in FIG. 15c.

In the third step, within the optimization limits $\Delta M_{min}$, $\Delta M_{max}$, the operating point of best efficiency is determined, which operating point also simultaneously defines the torques of the electric machine EM1 and of the ICE. This can be seen in FIG. 15c, in which the efficiency is plotted versus the differential torque $\Delta M$. The sinusoidal characteristic curve 96 of the overall efficiency is given by the superposition of the efficiency characteristic maps of the two machines ICE and EM1 (in the background of the diagram, not visible), for $\Delta M_{Max}$. The highest point 97 on the sinusoidal line 96 between the limits $\Delta M_{Min}$ and $\Delta M_{Max}$ is the optimum operating point. The latter corresponds to the optimum differential torque $\Delta M_{Opt}$ on the abscissa of diagram c).

In the final step, the torque to be set at the machines is determined from this, wherein $$M_{ICE} = M_{DD} + \Delta M_{Opt}$$

$$M_{EM1} = -\Delta M_{Opt}$$

In diagrams a) and b), $M_{ICE}$ corresponds to point 98 and $M_{EM1}$ corresponds to point 99.

2. Efficiency Calculation

The efficiency calculation determines, for the possible modes AMGK, the overall efficiency at the operating points (defined in terms of torque and rotational speed of the machines) for the torques calculated under "operating point determination", as a function of the system state. The overall efficiency is based on the entire power flow in an efficiency chain. Said overall efficiency sets the fuel consumption per unit time in relation to the output mechanical power at the wheels.

For example, during the charging of the battery by recuperation of the braking energy, consideration is given to the efficiency chain from the tank 105 (in FIG. 16) ("chemical" energy store) via an electric machine that is operated as a generator, the battery and its inverter, and additionally the efficiency chain from the battery via the electric machine that is operated as a motor, and the force transmission arrangement, to the wheels. The electrical energy stored in the battery is set in relation to the additional fuel consumption of the ICE via the efficiency chain from the ICE to the battery (by $\eta_{OptLPAH\_dP}0$), resulting in a virtual fuel consumption even during purely electric driving. As a result, the efficiency can also be determined in said operating mode.

The efficiency is the quotient of the power output to the road and all the power supplied from fuel and recuperation; in other words, said efficiency is the quotient of the power output by the system and the total power supplied to the system by the fuel of the ICE and by recuperation. This is symbolically illustrated in FIG. 16.

Figure 16:
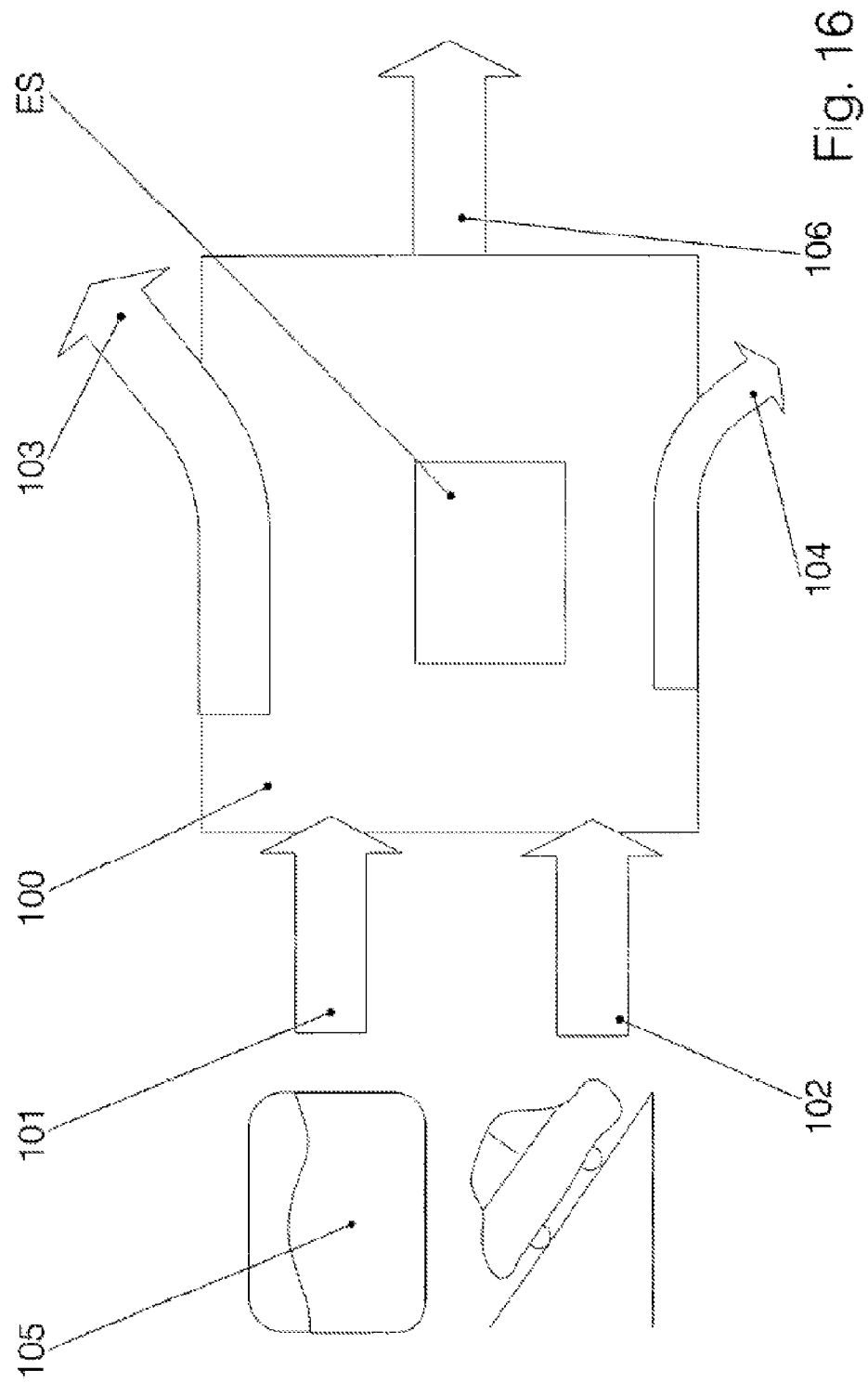
FIG. 16 shows a diagram relating to module 8, calculation of efficiency.

In FIG. 16, the energy supply is from the fuel from the fuel tank (arrow 101) and by recuperation (arrow 102). The system 100 is the entire vehicle with its hybrid drive and with its energy store ES. Energy losses are generated in the drivetrain (arrow 103) and by auxiliary consumers (arrow 104). The power output by the system is the propulsion (arrow 106).

Here, a distinction is to be made between traction operation (=positive axle torques) and overrun operation (=negative axle torques) of the vehicle. A combination of positive and negative axle torques is ruled out (no mode AMGK). With regard to the powers, consideration is always given to the absolute values.

Module 9: Charging State Evaluator (SOC)

It is the object of said module to evaluate the modes AMGK according to their influence on the battery charging state.

Those modes AMGK which have a positive effect on the charging state of the battery (ES) are evaluated as being good, and the others are evaluated as relatively poor. An empty battery should be charged, and a full battery should be discharged to the greatest possible extent.

Figure 17:
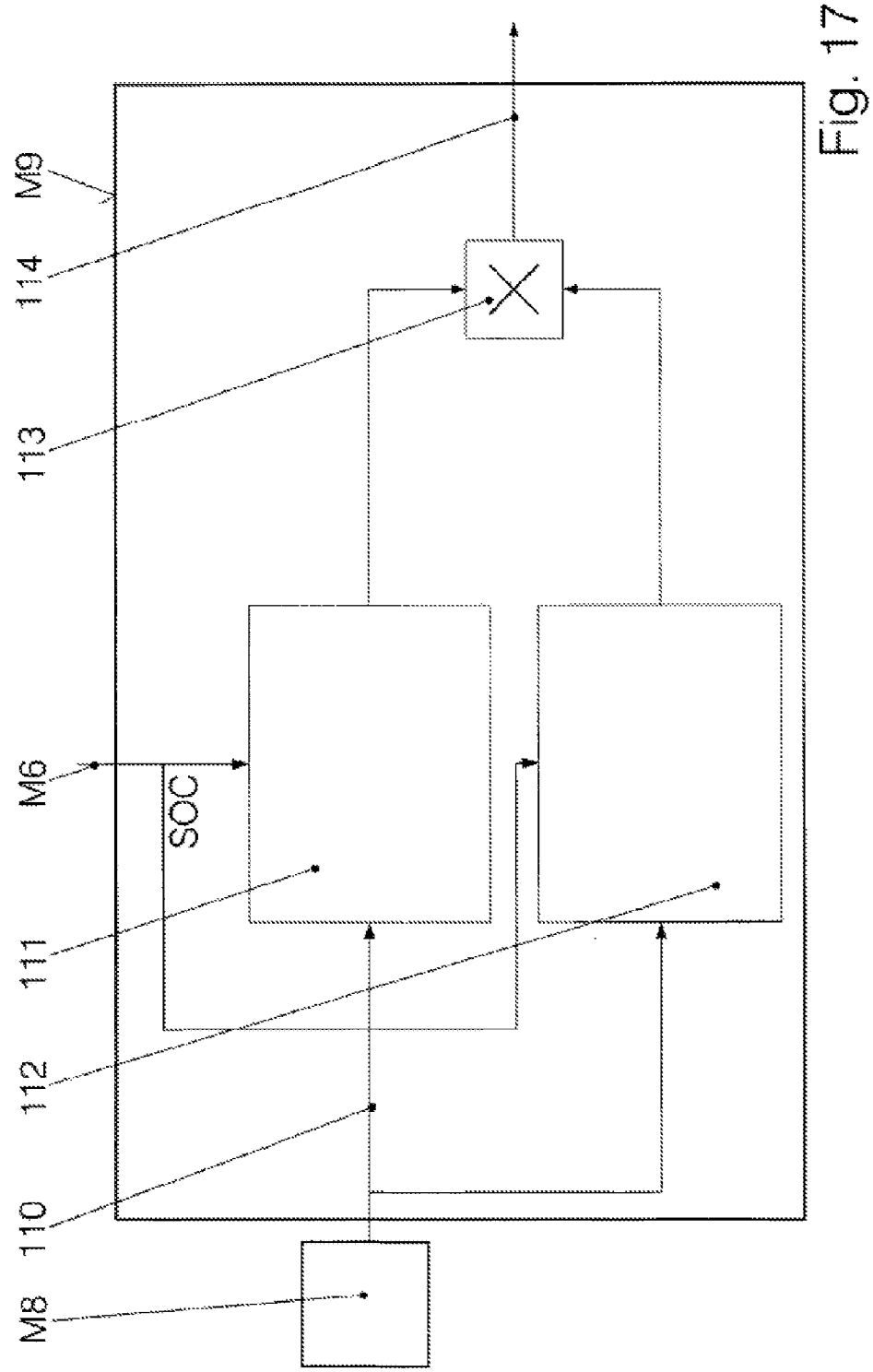
FIG. 17 shows a block diagram of module 9 in FIG. 5.

The charging state evaluator module M9 adjoins the efficiency calculation module M8 and is also connected at the input side to the charge management module M6. Said module M9 outputs a value grade $BF_{SOC}$ for all possible modes AMGK. The determination of said value grade $BF_{SOC}$ for a mode AMGK is illustrated in FIG. 17. The signal 110 ($HCU_{WBPhvBatt}$) that indicates the estimated power demand for the battery ES (positive: battery being discharged, negative: battery being charged) passes from the efficiency calculation (M8) to a block 111 (stabilization) and to a block 112 (power loading of the battery). The signal 110 ($HCU_{WBPhvBatt}$) for each mode AMGK that is available for selection is a clear measure for the influence of said mode AMGK on the battery charging state.

The evaluation of the battery power with regard to the charging state takes place from two aspects: in the first block 111, the mode (AMGK)-specific battery power is evaluated in terms of its influence on a regulated charging state of the battery ES (between around 40 and 70% charged); after the second block (112), the power loading of the battery is evaluated.

For the evaluation of the charging state (stabilization) in block 111, value grades of between $BF_{SOCstable}=0$ and $BF_{SOCstable}=1$ are available. In the extreme case, for an empty battery, a mode AMGK with maximum charging power is evaluated with 1 and a mode AMGK without charging power is evaluated with 0, or for an empty battery, said modes are evaluated with 0 and 1 respectively.

For the evaluation of the power loading of the battery (block 112): the charging state management module (M6) has the task of performing the charging control of the battery, and thereby provides the basis for the evaluation of the charging power. The dynamics management (M7) is responsible for the discharging limits with regard to mechanical performance (torque). The module M9 therefore also evaluates the discharging power of the battery in order to make a discharging/charging of the battery in different modes AMGK actually comparable. Very low powers are expedient for the service life of the battery, while very high powers are damaging. The value grades $BF_{SOCPower}$ are selected correspondingly in the range between 0 and 1.

The two value grades $BF_{SOCStable}$ and $BF_{SOCPower}$ are merged in a block 113 by multiplication to form an overall value grade $BF_{SOC}$. This corresponds to a trade-off between a fast attainment of the optimum charging state and protective charging/discharging of the battery. The multiplicative combination has the effect that a very low value grade can have a very strong influence, which is possible because the value grades are never entirely equal to zero.

Module 10: Heat Evaluator

Figure 18:
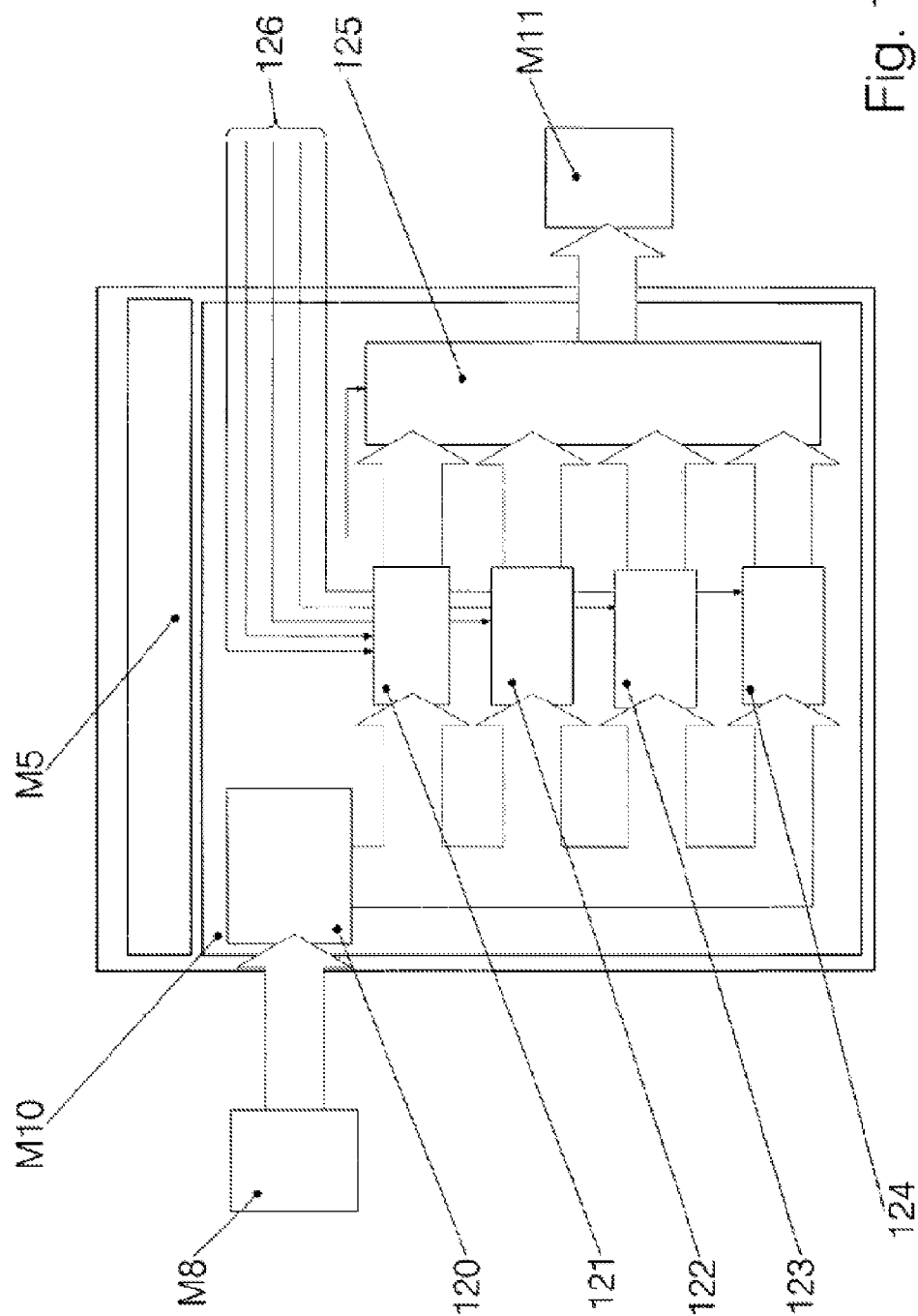
FIG. 18 shows a block diagram of module 10 in FIG. 5.

The heat evaluator has the task of influencing the selection of a mode AMGK by evaluation according to the thermal development of the ICE, of the electric machines and of the battery. The power losses at the operating point are significant for the thermal states of said components. Module 10 is connected at the input side to the efficiency and operating point module M8, to the heat management module M5 and to temperature sensors (not illustrated). In FIG. 18, in each case one block (121-124) is provided for the calculation and evaluation of the power loss of each component (ICE, EM1, EM2, ES) at the operating point for all possible modes AMGK. The individual value grades of the parallel assessment of the thermal development in the components are merged in the block 125.

For this purpose, the power losses from the torques and rotational speeds of the individual machines and from the individual efficiencies thereof (from module M8) are calculated in block 120 for each possible mode AMGK and the operating points of each component already also determined in module M8. From said power losses, the individual value grades BF are then determined taking into consideration the temperatures (126) of the components in blocks 121 to 124, specifically $BF_{HeatICE}$ for the ICE in block 121, $BF_{HeatEM1}$ for EM1 in block 122, $BF_{HeatEM2}$ for EM2 in block 123, and $BF_{HeatBatt}$ for the battery (ES) in block 124.

Calculation of the Value Grade $BF_{HeatICE}$ of the Internal Combustion Engine

The overall evaluation in block 121 is divided into the best possible attainment of the optimum temperature (actual heat management), the assessment of the generated fuel throughput as a function of the temperature, the prevention of excessively high temperatures, and the service life of the internal combustion engine. Both "ensuring heating" and also "assessing fuel throughput at low temperatures" determine their value grades from the power loss and the temperature of the ICE.

Calculation of the Value Grades $BF_{HeatEM1}$ and $BF_{HeatEM2}$ for EM1 and EM2

In blocks 122 and 123, the value grades for the power losses of the electric machines are determined. A simple estimation of the thermal state to be expected is for example to set the power loss of the electric machine in the possible modes AMGK in relation to the power loss that would presently occur at maximum power. One thereby obtains, for the two electric machines, value grades $BF_{BWEM1}$ and $BF_{BWEM2}$, which again lie between 0 and 1. Here, the best evaluation is given for a power loss of 0, and the poorest evaluation is given for maximum power loss. As a result, modes AMGK are preferred in which the machines may cool down when they are hot.

Calculation of the Value Grade $BF_{HeatBatt}$ of the Battery

It is sought to evaluate, for the desired battery power at the operating point, the steady-state final value of the battery temperature, and the tendency of the heat development. The value grade for the temperature of the battery is therefore divided into two parts which are added. Addition is selected since, even in the case of a steady-state final value that lies outside the permitted temperature range, the value grade may not be zero. This highest value grade is assigned when the optimum temperature is reached. Since this involves one of two value grades that undergo addition, the maximum value for the value grade $BF_{BWBatt1}=0.5$. If the value for the final temperature lies outside a permitted band, only a value grade of $BF_{BWBatt}=0$ can be given.

In block 125, an overall value grade $BF_{BWOverall}$ is calculated by multiplication from the individual value grades from blocks 121-124, $BF_{BWICE}$, $BF_{BWEM1}$, $BF_{BWEM2}$ and $BF_{BWBatt}$, wherein the individual value grades may be provided with weighting factors. Here, it is also possible to omit individual value grades entirely.

Module 11: Dynamics Evaluator

The aim of the dynamics evaluator is to evaluate all the modes AMGK with regard to their dynamics. It is the object of said dynamics evaluator to evaluate the magnitude of the torque of each mode AMGK according to the deviation from the driver demand DD. The dynamics value grade ($BF_{Dynamics}$) is determined from partial evaluations for the torque magnitude and for the acceleration capability (from the tractive force reserve and the evaluation of the position of the operating point).

The dynamics evaluator M11 is connected at the input side directly to the heat evaluator (M10), indirectly to the operating point/efficiency module (M8) and to the dynamics management module (M7), and provides the dynamics value grade $BF_{Dynamics}$ at the output side.

Figure 19:
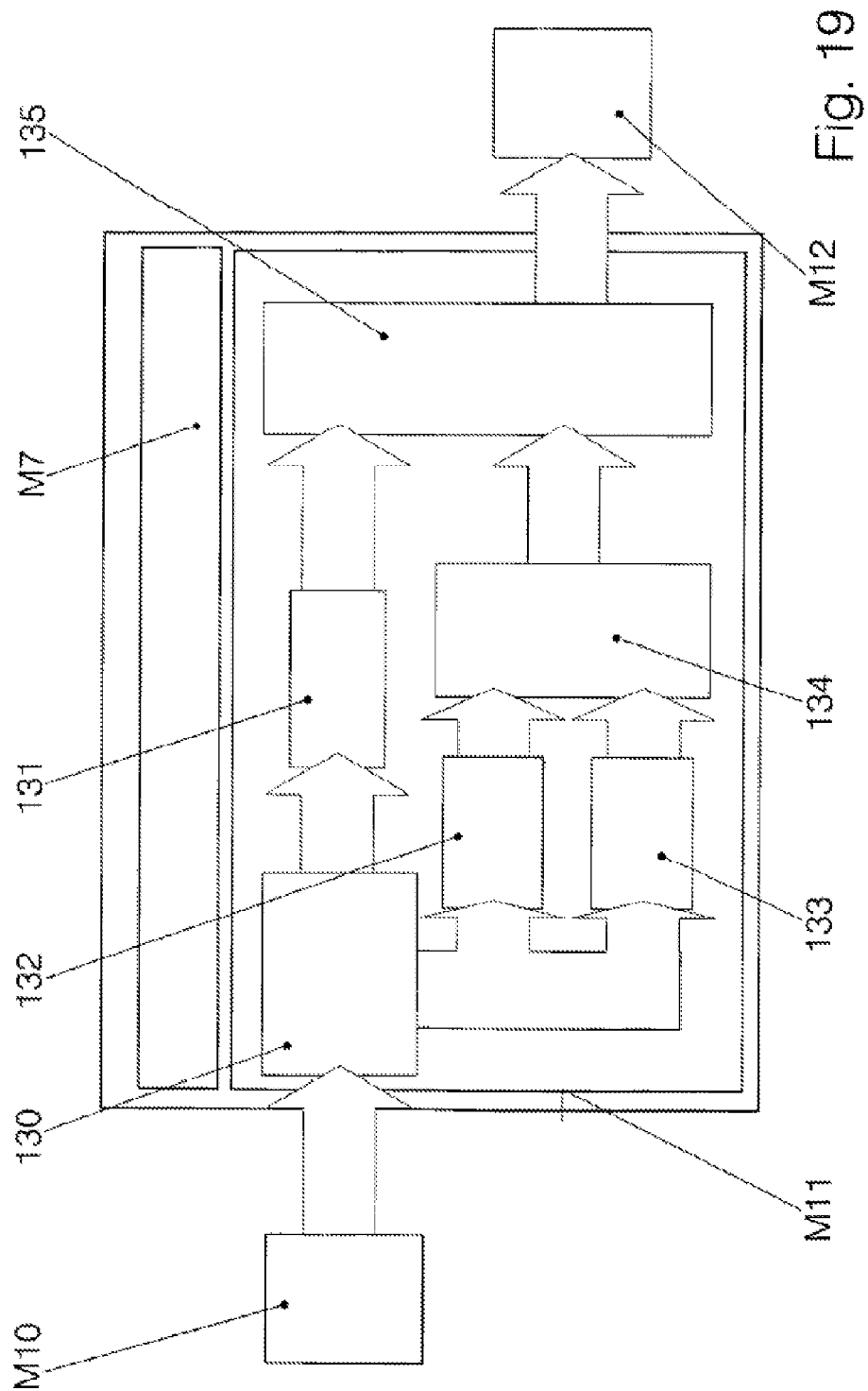
FIG. 19 shows a block diagram of module 11 in FIG. 5.

FIG. 19 shows the blocks provided for this purpose: a "calculation of total axle torque" block 130, an "evaluation of torque magnitude" block 131, an "evaluation of tractive force reserve" block 132, an "evaluation of operating point" block 133, an "evaluation of acceleration capability" block 134, which merges the results of blocks 132 and 133, and finally a "calculation of dynamics value grade" block 135, which merges the results of block 131 and block 134.

Since the total axle torque from module M2 may deviate from that specified by the driving dynamics controller on account of a lack of a power reserve of one of the components, said total axle torque must be re-calculated from the operating points for each mode AMGK. The calculation is carried out in the block 130, since the starting value, with the exception of in the dynamics evaluator, is also required further below in the comfort filter. The torque of a mode AMGK is given by the addition of the torques for all three machines at the operating points (from module 8) taking into consideration the respective transmission ratios, as: $M_{OP} = (M_{OP,ICE} + M_{OP,EM1}) * i_{Gear} * i_{RAD} + M_{OP,EM2} * i_{FAD}$ The total axle torque determined in block 130 is evaluated in block 131. The evaluation of the torque magnitude is identical in traction and overrun operation. The value grade lies between 0 and 1. The relationship between the value grade and the deviation may be linear. It is advantageous for the relationship to be produced on the basis of a parameterizable curve, which falls very steeply from the value 1 if the driver demand cannot be met.

The tractive force reserve is evaluated in block 132. This is intended to enable a dynamic consideration of the acceleration capability in addition to the static consideration of the torque magnitude. Here, and below, a "tractive force reserve" is always to be understood to mean a torque. Depending on the driving situation, a tractive force reserve must be maintained by means of the shift strategy. The consideration of the tractive force reserve is expedient only for traction operation.

For the evaluation of the tractive force reserve, it is necessary to calculate the present tractive force reserve of each mode AMGK and compare said present tractive force reserve with the desired tractive force reserve. It is additionally of significance whether the tractive force reserve is imparted by the internal combustion engine or an electric machine. The evaluation of the magnitude of the tractive force reserve takes place in three steps. Firstly, the present tractive force reserve is determined for each (traction) mode AMGK. Subsequently, the desired tractive force reserve is formed, and finally, said desired tractive force reserve is compared with the present tractive force reserve. All of this is combined in block 132.

Calculation of the Present Tractive Force Reserve

The tractive force reserve is determined for each mode AMGK. The tractive force reserve is the difference between the present torque that is called upon from the machines and the maximum possible torque—without thereby having to operate a clutch or shift gears. This means that, for example in the case of purely internal combustion engine—rear-axle drive operation, it is necessary for this purpose to take into consideration the maximum torque of the internal combustion engine, that of EM1 (which is coupled and could be immediately supplied with current if required) and, if the clutch C3 is closed, that of EM2. Here, it is not of significance that the mode AMGK must be switched in order to call upon the torque of the electric machine EM1. The determination of the tractive force reserve is therefore not mode (AMGK)-specific, but rather is dependent on the clutch position and on the available power of the machines.

The entire tractive force reserve corresponds to the addition of the tractive force reserves of the ICE and of the electric machines:

$$M_{Res} = M_{Res,ICE} + M_{Res,EM}.$$

All the other modes AMGK do not relate to traction operation. Said modes AMGK are all evaluated equally with "1".

Calculation of the Tractive Force Reserve According to Driver Demand

The tractive force reserve derived from the driver demand is varied as a function of the dynamics factor and gradient. The magnitude of the torque reserve is evaluated in block 132, in a similar fashion to the torque magnitude in block 131, with a value grade of between 1 and (almost) 0.

The composition of the tractive force reserve is evaluated in block 132. Not only the mere provision of the desired tractive force reserve is of significance, but rather also the composition of said tractive force reserve. A tractive force reserve that is applied purely using electric machines instead of using the internal combustion engine has the advantage that it is available more quickly. Furthermore, the tractive force reserve by means of electric machines has the advantage that it need not—like an ICE—be "paid for" with an unfavorable operating point. The value grade $BF_{composition}$ is determined in block 132 from the composition of the tractive force reserve, under the assumption of a linear relationship between the composition and value grade, according to the equation:

$$BF_{Composition} = M_{ReserveICE}/(M_{ReserveICE} + M_{ReserveEM})$$

In the evaluation of operating point block 133, allowance is made for the fact that not only the mere provision of the driver demand torque is of significance but rather also the composition of said driver demand torque. An operating point that is realized with a high electric machine proportion leads to better acceleration values in the event of an acceleration than an operating point that is covered for the most part by the internal combustion engine. This is evaluated with a further value grade $BF_{OP}$, which lies between 0 and 1. The value grade is calculated, with a linear relationship, as follows:

$$BF_{OP} = M_{ICE}/(M_{ICE} + M_{EM1} + M_{EM2})$$

For the evaluation of the acceleration capability, the value grades $BF_{RES}$ from block 132 and $BF_{OP}$ from block 133 are merged in block 134. If, during steady-state driving, only a small potential for acceleration is maintained, only said small reserve can be called upon in the event of acceleration. It is therefore possible to evaluate both the tractive force reserve (of all the machines overall) and also the composition of the tractive force reserve from the tractive force reserves of the individual machines at the operating point.

The tractive force reserve is relevant for a potential acceleration. Said tractive force reserve is therefore primarily of significance when the vehicle is not presently accelerating. The composition of the operating point, in contrast, is only of significance when the vehicle is presently accelerating. The evaluation of the tractive force reserve and operating point alternates according to the magnitude of the factor $E_{Dyn}$. It is expedient here to use the same dynamics factor as is also used in the dynamics management, since there, the EM proportion of the operating point is influenced by said dynamics factor.

In block 135, the dynamics value grade $BF_{Dyn}$ is calculated from the two partial value grades for the torque magnitude and the acceleration capability, and for the tractive force reserve and the position of the operating point, from blocks 131 to 134.

Module 12: Formation of the Overall Value Grade

In the simpler form, only a purely multiplicative relationship between the value grades is assumed, and no further dependency is taken into consideration. The overall value grade $BF_{Overall}$ is then determined as:

$$BF_{Overall} = \eta * BF_{Dynamics} * BF_{Heat} * BF_{SOC}$$

The value range of all the value grades lies between 0 and 1, and therefore, on account of the purely multiplicative combination, the value range for $BF_{overall}$ likewise lies between 0 and 1. In a refinement of the simple multiplication, it is possible for the individual value grades and the efficiency $\eta$ (from module 8) to firstly be provided with weighting factors.

Module 13: Comfort Filter

In said module, the present (old) mode AMGK, with its values that describe the operating state of the vehicle, is compared with the possible modes AMGK including their calculated operating points. The comfort filter is responsible for the transition from one mode AMGK to another, and influences the overall value grade of the mode AMGK.

Figure 20:
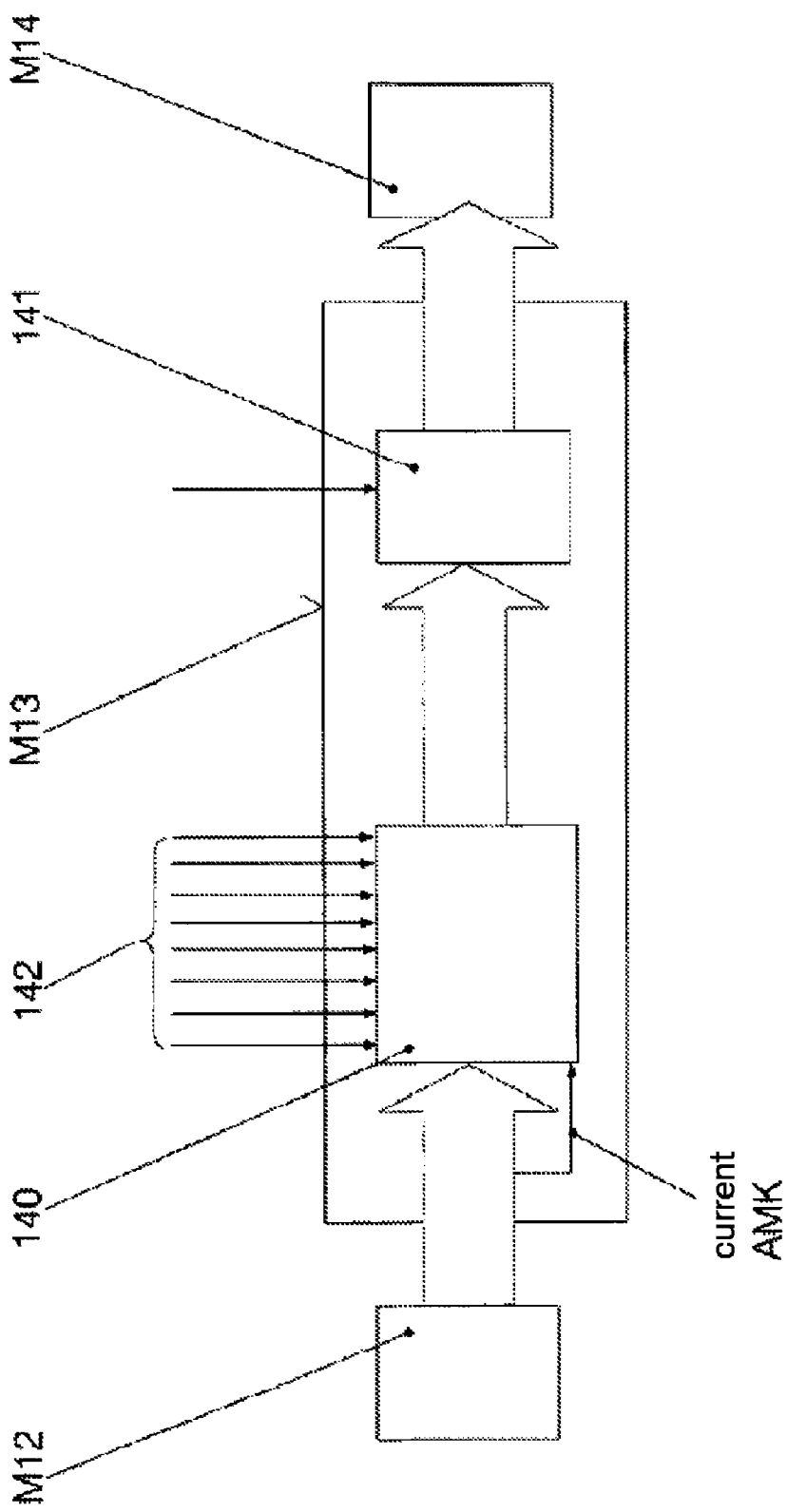
FIG. 20 shows a block diagram of module 13 in FIG. 5.

FIG. 20 illustrates the software structure of the comfort filter, in which firstly the change from the present mode AMGK to the mode AMGK to be compared is assessed according to various criteria. The module is connected at the input side to the overall evaluation module M12, and therefore indirectly also to the dynamics evaluator module M11, and to the system state analysis module M1 and to the conditioning unit 11, which provides present variables 142 (gear, axle torques, throttle pedal angle, machine rotational speeds, vehicle speed) that describe the present operating state. Said module M13 comprises a block 140 for assessing the disturbances caused by a change in mode AMGK, and a block 141 for evaluating the overall comfort.

The following symptoms should be assessed, since they can impair comfort during a change in mode AMGK:
- unsuitable shift behavior
- excessively frequent rotational speed or torque change of the internal combustion engine
- noises of the internal combustion engine
- interruption in tractive force in terms of magnitude
- excessively frequent interruptions in tractive force
- torque shift between the drive axles.

All the individual assessments are transmitted to the "filtering and evaluation" block 141.

In the assessment of the noise development of the ICE, it is assumed that the noises of said ICE are generated independently of one another by the torque and the rotational speed. In the assessment of the noises, it is possible to assume, with good approximation, that an increase in said noises is linearly proportional to power. Both the torques of the present mode AMGK and of the mode AMGK to be evaluated and also the rotational speed (and the torque and rotational speed jumps) have been calculated in module 8 and are available here.

An interruption in tractive force, for example during a gearshift or during a start by means of one of the electric machines (soft start) may be partially compensated by means of the invention. The result, that can be perceived by the driver, of a loss in tractive force is a difference in acceleration $\Delta a$ (a jerk). Said jerk is dependent neither on the total axle torque $M_{nominal}$) before the interruption nor on the driving resistance (from the speed and gradient), but rather only on the absolute value of the torque decrease.

In block 141 (filtering and evaluation), further value grades are then formed for all the remaining modes AMGK, which value grades are added to give the overall value grade $BF_{Overall}$, that is to say are counted toward the latter. Individual comfort evaluations may be activated and deactivated.

Module 14: Sorter

In said module, those modes AMGK that are still possible are sorted according to their overall value grade $BF_{overall}$, increased by the value grade $BF_{comfort}$ (if present); the mode AMGK with the highest evaluation is ranked highest. Only those modes AMGK in which the KO vector=1 (that is to say not 0, since 0 means "knock-out") are included in the sorting. If there are two modes AMGK with the same overall value grade (possibly in a small bandwidth), that mode AMGK which is presently set must initially take priority. The sorting is stored in the KO vector. Instead of a "1", the KO vector is then therefore provided with the sorting of the respective modes AMGK, a value of between 0 and 1. Modes AMGK in which the KO vector was equal to 0 before the sorting remain unchanged.

Module 15: Status Machine AMK

The status machine (AMK) module is situated at the end of the filter chain of the entire hybrid controller HCU. Said module receives, from the final module of the filter chain block, the sorter (M14), the list of modes AMGK sorted according to value grades and efficiency, and from said list, finally carries out the selection taking applicability into consideration. On the basis of the selected mode AMGK*, the interface to the torque coordinator M16 is then prepared.

FIG. 21 shows the module 15 as a connecting element between the sorter module M14 and the torque coordinator M16. The following signals (as a result of the selection, said signals have been provided with the suffix "nominal") must be supplied via the respectively prepared interfaces to the torque coordinator which, with corresponding routines and time profiles, converts the nominal values
- the nominal value of the ICE: MICEnominal
- the nominal value of EM1: MEM1nominal
- the nominal value of EM2: MEM2nominal
- the nominal transmission gear: GSTnominal
- commands for the clutches C1-C4 that are to be shifted respectively
- various further commands (for example start-stop) into a transmission gear G, a torque of the ICE, a torque (torques positive or negative) of the individual electric machines EM1, EM2, and clutch positions.

The invention claimed is:

1. A method for controlling a hybrid drive of a motor vehicle, which hybrid drive comprises the following components: an internal combustion engine (ICE), a multi-step transmission (ST), an axle drive gearing (RAD), at least one electric machine (EM1; EM1, EM2), at least one clutch ($C_j$) and at least one energy store (ES), and at least one driven axle (RA; FA; RA, FA), comprising the steps of:

a) calculating at least one required torque corresponding to driver demand (DD) on the basis of data that describes the driver demand (DD), operating state of the motor vehicle and system state (SSA), b) determining by a processor on the basis of said data, which describes at least one torque and the operating state of the motor vehicle and the system state (SSA), from all modes, possible modes (AMGK) and transmission stages (G), c) determining by the processor for said possible modes (AMGK), optimum operating points (OP), which correspond to the driver demand (DD), of the components involved in individual respective modes taking into consideration the operating state and system state (SSA), d) wherein, for the calculation of optimum efficiencies ($\eta_{ICE}$, $\eta_{EM1}$, $\eta_{EM2}$) and operating points (OP) of the possible modes (AMGK), firstly, limit values of the maximum torque of individual machines (ICE, EM1, EM2) are calculated for each gear stage (G) taking into consideration mechanical configuration and transmission ratios ($Ü_{ST}$, $Ü_{FAD}$, $Ü_{RAD}$), then, for all modes (AMGK), the optimum operating points (OP) of the individual machines (ICE, EM1, EM2) are determined taking into consideration limit values, and, for said operating points (OP), the individual efficiencies ($\eta_{ICE}$, $\eta_{EM1}$, $\eta_{EM2}$) and, resulting from these, overall efficiencies ($\eta_{AMGK}$) for all the possible modes are determined, e) then evaluating the modes (AMGK), with the overall efficiency being one of a number of evaluation criteria, and a mode (AMK*) that is evaluated as being the most favorable is selected, f) finally, outputting nominal values or commands, which correspond to the operating points (OP) of the selected mode (AMK*), for fulfilling the driver demand (DD) for the adjustment of the components (ICE, EM1, ES; ICE, EM1, EM2, ES) involved in the respective mode (AMK*).

2. A method according to claim 1, further including, in the case of a motor vehicle having two driven axles (RA, FA), firstly only the entire torque to be transmitted ($M_{DD}$) is taken into consideration and the distribution thereof between the axles (RA, FA) is calculated if a traction intervention (TI=1) is present, and is calculated only in a later step if no traction intervention (TI=0) is present.

3. A method according to claim 1, wherein the limit values for the determination of the optimum operating point (OP) of the individual components (ICE, EM1, EM2, ES) are limit values of the power ($P_{max}$) of the individual components (ICE, EM1, EM2, ES) that are determined from thermal state and from characteristic maps of the respective motor components (ICE, EM1, EM2).

4. A method according to claim 1, wherein the limit values for the determination of the operating point (OP) of the individual components (ICE, EM1, EM2) are limit values of power input capacity $P_{ESmax\text{-}charged}$) of the energy store (ES) in its present charging state.

5. A method according to claim 1, wherein the position of the operating points (OP) in the characteristic maps of the individual components is taken into consideration in the evaluation of modes (AMK; AMGK).

6. A method according to claim 1, wherein, in step c) thereof, all the evaluations of the individual modes (AMK; AMGK) are merged and the modes (AMK; AMGK) are sorted according to the magnitude of the evaluation result and the mode (AMK*; AMGK*) with highest evaluation is selected.

7. A method according to claim 1, wherein the nominal values or commands for the adjustment of the components involved in the selected mode (AMK*) for the selected mode (AMK*) are the values, which form the basis of the calculation of the efficiencies ($\eta_{ICE}$, $\eta_{EM1}$, $\eta_{EM2}$) and which are determined taking into consideration the operating state and system state (SSA) for the respective mode, at the operating point (OP).

8. A control system for a motor vehicle with a hybrid drive which is composed of the following components: an internal combustion engine (ICE), a multi-step transmission (ST), at least one axle drive transmission (RAD; FAD; FAD, RAD), at least one electric machine ($EM_i$), at least one clutch ($C_j$), an energy store (ES) and at least one driven axle (RA; FA; RA, FA), with a driver demand evaluation (DD) detecting, from throttle pedal position, brake pedal position and a wheel rotational speed, an operating state (acceleration, deceleration, kickdown, etc.) that a driver wishes to attain, and a hybrid controller determines nominal values or commands to be set at the components, and a torque coordinator (M16) assigns the nominal values and commands for activation of the components to said components and converts said nominal values and commands into actuating variables for the control of said components, the hybrid controller (HCU) comprises:

a) a system state analysis module (SSA) (M1) that, with present variables ($v_{Vehicle}$, $T_{ICE}$, etc.) that describe the operating state, carries out preliminary calculations and stores the results thereof ($\omega_{ICE}$, $\omega_{EMi}$, $Flag_{Starting}$, $Flag_{Braking}$), b) a driving dynamics controller (FD) that, from the driver demand (DD) and the present operating state of the vehicle, calculates and stores the at least one torque ($M_{FA}$; $M_{RA}$; $M_{FA}$, $M_{RA}$) that is required at the at least one axle in order to fulfill the driver demand, c) a number of further modules that, from the variables stored by the system state analysis module (SSA) (M1) and by the driving dynamics controller (FD), determine possible modes (AMGK) and optimum operating points (OP) of the components in said modes (AMGK), and after the evaluation of the modes (AMGK), select the most favorable drive mode (AMGK*) and generate the nominal values for the optimum operating points of the components in the selected mode (AMGK*).

9. A control system according to claim 8, wherein the system state analysis module (SSA) (M1) calculates, from a value that specifies present driving speed ($v_{Vehicle}$) of the vehicle and from the transmission ratios ($Ü_{STi}$, $Ü_{RAD}$, $Ü_{KT}$, $Ü_{FAD}$), the imaginary rotational speeds of the individual machines (ICE, EM1, EM2) in the individual transmission gears ($G_i$) for the possible modes (AMGK).

10. A control system according to claim 8, wherein the hybrid controller (HCU) comprises a heat management module (M5) that is connected at the input side to the system state analysis module (SSA) (M1) and that comprises a block (51) that determines electrical power limits of the electric machines ($EM_i$) and the thermally limited maximum power of the internal combustion engine (ICE).

11. A control system according to claim 8, wherein the hybrid controller (HCU) comprises an operating point optimization/efficiency calculation module (M8) that is composed of the two sub-modules of operating point optimization (80) and efficiency calculation (81), with the two sub-modules of operating point optimization (80) being connected at the input side to the dynamics management (M7) and gear pre-selection (M4) modules and defining optimum operating points (OP) for all the modes (AMK; AMGK) and the machines (ICE, EM1, EM2) involved in said modes.

12. A control system according to claim 8, wherein the hybrid controller (HCU) comprises an overall evaluation module (M12) that merges all value grades ($BF_{Heat}$, $BF_{Dynamics}$, $BF_{SOC}$) to form an overall value grade ($BF_{Overall}$).

* * * * *